(12) United States Patent
Tan et al.

(10) Patent No.: US 9,837,832 B2
(45) Date of Patent: Dec. 5, 2017

(54) WIRELESS POWER TRANSFER DEVICE AND METHOD

(71) Applicant: MOTOROLA SOLUTIONS, INC., Schaumburg, IL (US)

(72) Inventors: Teik Siew Tan, Penang (MY); Chee Khon Chong, Penang (MY); Sin Keng Lee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 178 days.

(21) Appl. No.: 14/983,369

(22) Filed: Dec. 29, 2015

(65) Prior Publication Data

US 2017/0187197 A1 Jun. 29, 2017

(51) Int. Cl.
*H01F 27/42* (2006.01)
*H01F 37/00* (2006.01)
*H01F 38/00* (2006.01)
*H02J 5/00* (2016.01)

(52) U.S. Cl.
CPC ............. *H02J 5/005* (2013.01); *H02J 5/00* (2013.01)

(58) Field of Classification Search
USPC .................................................. 307/104, 105
See application file for complete search history.

(56) References Cited

U.S. PATENT DOCUMENTS

| | | | |
|---|---|---|---|
| 2010/0289341 A1 | 11/2010 | Ozaki et al. | |
| 2011/0050382 A1* | 3/2011 | Baarman | H01F 1/26 336/221 |
| 2011/0084656 A1* | 4/2011 | Gao | H02J 7/025 320/108 |
| 2012/0049991 A1* | 3/2012 | Baarman | H01F 17/0013 336/199 |
| 2012/0161535 A1 | 6/2012 | Jung et al. | |
| 2012/0223573 A1* | 9/2012 | Schatz | H02J 5/005 307/9.1 |
| 2013/0127253 A1* | 5/2013 | Stark | A61N 1/3787 307/104 |

(Continued)

FOREIGN PATENT DOCUMENTS

| | | |
|---|---|---|
| EP | 2546999 | 1/2013 |
| WO | 2015/175096 | 11/2015 |

OTHER PUBLICATIONS

PCT/US2016/065137 International Search Report and Written Opinion of the International Searching Authority dated Feb. 2, 2017 (11 pages).

(Continued)

*Primary Examiner* — Adam Houston
(74) *Attorney, Agent, or Firm* — Michael Best & Friedrich LLP

(57) ABSTRACT

A wireless power transfer device including a first coil having a first portion, and configured to generate a magnetic field, and a second coil having a second portion. The second coil positioned with respect to the first coil such that the first portion of the first coil overlaps the second portion of the second coil in an overlap region. The wireless power transfer device also includes a power amplifier electrically coupled to one selected from a group consisting of the first coil and the second coil, and a flux concentrator aligned with the overlap region and configured to concentrate a magnetic flux of the magnetic field. The power amplifier configured to output a drive signal.

25 Claims, 15 Drawing Sheets

(56) References Cited

U.S. PATENT DOCUMENTS

| | | | |
|---|---|---|---|
| 2013/0241308 A1* | 9/2013 | Bilbrey | G01R 33/3692 307/104 |
| 2015/0076921 A1 | 3/2015 | Park et al. | |
| 2015/0102685 A1* | 4/2015 | Blood | H02J 5/005 307/104 |
| 2016/0049232 A1* | 2/2016 | Covic | H01F 27/346 335/299 |
| 2017/0187197 A1* | 6/2017 | Tan | H02J 5/00 |
| 2017/0187238 A1* | 6/2017 | Chong | H02J 50/10 |

OTHER PUBLICATIONS

Wikipedia, "Qi ( inductive power standard)," website, Nov. 29, 2015, https://en.wikipedia.org/wiki/Qi__(inductive_power_standard).

* cited by examiner

WIRELESS POWER TRANSFER DEVICE AND METHOD

BACKGROUND OF THE INVENTION

Interest for wireless power transfer has been growing recently. Additionally, there are various applications for wireless power transfer such as, for example, charging of batteries in small electronic devices (e.g., smart telephones, tablet computers, and the like), electric vehicles, and/or other electronic devices. Wireless power transfer (WPT) may be achieved in a number of ways. One wireless power transfer technology is magnetic-resonance power transfer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
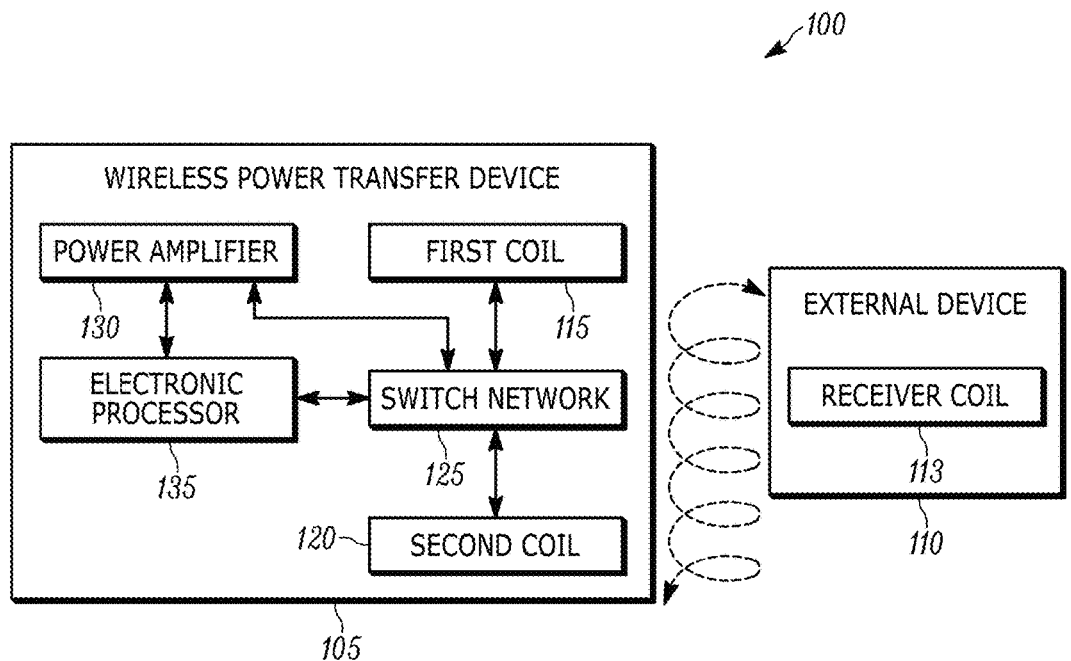
FIG. 1 is a block diagram of a wireless power transfer system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a wireless power transfer device that in one particular instance includes a first coil having a first portion. The first coil is configured to generate a magnetic field. The wireless power transfer device also includes a second coil having a second portion. The second coil is positioned with respect to the first coil such that the first portion of the first coil overlaps the second portion of the second coil in an overlap region. The wireless power transfer device also includes a power amplifier electrically coupled to one selected from a group consisting of the first coil and the second coil, and configured to output a drive signal. The wireless power transfer device further includes a flux concentrator aligned with the overlap region and configured to concentrate a magnetic flux of the magnetic field.

Another embodiment provides a method of wirelessly transferring power with a wireless power transfer device that includes a first coil, a second coil, a power amplifier, a switch network, and an electronic processor. In one instance, the method includes overlapping a first portion of the first coil with a second portion of the second coil in an overlap region, aligning a flux concentrator with the overlap region, and generating, with the power amplifier, a drive signal. The method further includes receiving the drive signal by one selected from a group consisting of the first coil and the second coil, and generating, by one selected from the group consisting of the first coil and the second coil, a magnetic field in response to receiving the drive signal.

FIG. 1 illustrates a wireless power transfer system 100 including a wireless power transfer device 105 and an external device 110. In the example illustrated, the external device 110 includes, among other things, a receiver coil 113. The receiver coil 113 magnetically couples to the wireless power transfer device 105 to receive electrical power from the wireless power transfer device 105. The external device 110 may be, for example, a battery. The battery may be located in a smart telephone, a tablet computer, or other electrical device. For the sake of simplicity, the particular components of the external device 110 are not shown, but are understood by one of skill in the art.

In the embodiment illustrated, the wireless power transfer device 105 transfers power wirelessly to the external device 110 through magnetic resonance. In magnetic-resonance power transfer, a transmitter coil (i.e., the coil transmitting power) receives a current from, for example, a power amplifier, and generates a magnetic field. A receiver coil (i.e., the coil receiving power), for example, the receiver coil 113, is placed in close proximity to the transmitter coil. Power is transferred as a consequence of the receiver coil magnetically coupling to the transmitter coil. The efficiency of the power transfer is improved when the transmitter coil and the receiver coil have the same or similar size and form factor. However, in many applications it is not possible to match the size and form of the transmitter and receiver coils. For example, a wireless battery charger may be designed to charge batteries having a receiver coil of a certain configuration, but batteries may be manufactured by many different entities and lack a uniform configuration. As shown in FIG. 1, the wireless power transfer device 105 includes a first coil 115, a second coil 120, a switch network 125, a power amplifier 130, and an electronic processor 135. The wireless power transfer device 105 also includes a housing (not shown) that supports the first coil 115, the second coil 120, the switch network 125, the power amplifier 130, and the electronic processor 135. In some embodiments, the wireless power transfer device 105 may include more or less components than those mentioned above.

Figure 2A:
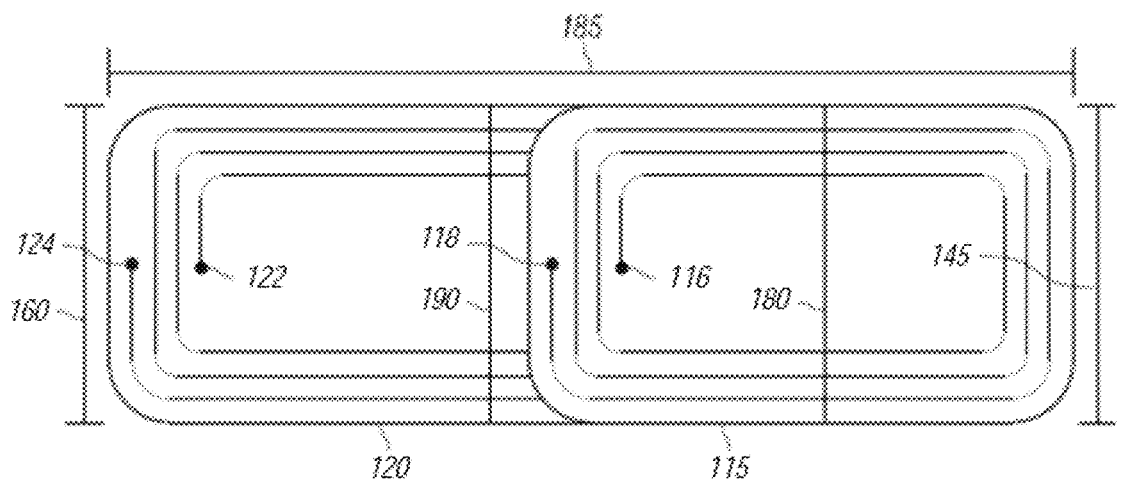
FIGS. 2A through 2B are diagrams of a wireless power transfer device of the wireless power transfer system of FIG. 1.

As shown in FIG. 2A, the first coil 115 includes a first looped wire having a first positive terminal 116 and a first negative terminal 118. The second coil 120 includes a second looped wire having a second positive terminal 122 and a second negative terminal 124. As shown in FIG. 1, the first coil 115 and the second coil 120 are coupled to the switch network 125, and are configured to selectively and, in some cases, simultaneously, receive power from the power amplifier 130 according to a configuration of the switch network 125. The power amplifier 130 generates a drive signal that is provided to the first coil 115, the second coil 120, or both. The first coil 115 and the second coil 120 generate a magnetic field in response to receiving the drive signal from the power amplifier 130. When the receiver coil 113 is within an applicable transmission range, the receiver coil 113 is magnetically coupled to the magnetic field generated by the first coil 115, the second coil 120, or both. As a consequence, electrical power is transferred from the wireless power transfer device 105 to the receiver coil 113.

Figure 2B:
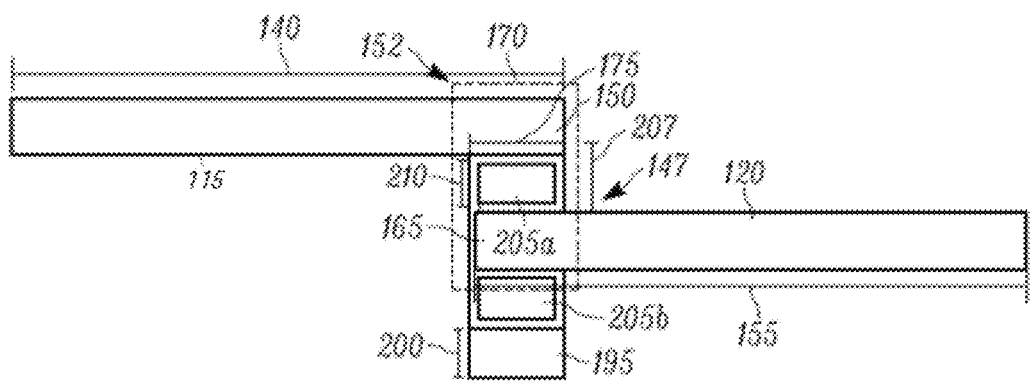

In one particular embodiment, as shown in FIG. 2B, the first coil 115 has a first length 140 of, for example, approximately eighteen (18) centimeters (cm) and a first width 145 of, for example, approximately twelve (12) centimeters. It should be understood; however, that these dimensions (as well as other dimensions provided herein) are examples and different dimensions could be used. The first coil 115 also includes a first portion 150 located at a first longitudinal end 152 of the first coil 115 along the first width 145. In the illustrated embodiment, the second coil 120 is substantially similar to the first coil 115. Thus, the second coil 120 has a second length 155 of approximately eighteen centimeters and a second width 160 of approximately twelve centimeters. The second coil 120 also includes a second portion 165 located at a second longitudinal end 147 of the second coil 120 along the second width 160. As shown in FIG. 2B, the second coil 120 is positioned such that the first portion 150 of the first coil 115 overlaps the second portion 165 of the second coil 120 in an overlap region 170. As shown in FIG. 2B, the size of the overlap region 170 is smaller than the size of the first coil 115 and smaller than the size of the second coil 120. In other words, the first coil 115 and the second coil 120 are only partially overlapped. The size (e.g., area and dimensions) of the overlap region 170 is not arbitrary, and is determined based on, for example, a geometry of the first coil 115, a geometry of the second coil 120, a number of turns of the first coil 115, a number of turns of the second coil 120, a width of turns of the first coil 115, a width of turns of the second coil 120, a spacing between the turns of the first coil 115, a spacing between the turns of the second coil 120, among other things. In the illustrated embodiment, the overlap region 170 has a third length 175 of approximately two (2) centimeters and a third width 180 of approximately twelve centimeters. In other words, the first portion 150 overlaps the second portion 165 by approximately two centimeters. Therefore, the overlapped first coil 115 and second coil 120 have an aggregate length 185 of approximately thirty-four (34) centimeters and an aggregate width 190 of approximately twelve centimeters. In other embodiments, the overlap region 170 may have different dimensions based on particular dimensions of the first coil 115 and the second coil 120.

As shown in FIG. 2B, the wireless power transfer device 105 also includes a flux concentrator 195 that concentrates the magnetic flux between the first coil 115 and the second coil 120. In other words, the flux concentrator 195 maximizes the magnetic flux coupling between the first coil 115 and the second coil 120 while minimizing magnetic losses in the coupling. In the embodiment illustrated, the flux concentrator 195 is aligned with the overlap region 170 and positioned underneath the second coil 120, as shown in FIG. 2B. In this position, the flux concentrator 195, due to its material properties, can improve the return loss when the first coil 115 and the second coil 120 are magnetically coupled. In the illustrated embodiment, the flux concentrator 195 includes a ferrite layer. The flux concentrator 195 also has a high permeability (e.g., 120) and low-loss factor (e.g., 0.017). In the illustrated embodiment, the flux concentrator 195 has a first height 200 of approximately three tenths of a millimeter (0.3 mm). Additionally, as shown in FIG. 2B, spacers 205a, 205b separate the first coil 115 from the second coil 120, and the second coil 120 from the flux concentrator 195. The spacers 205a, 205b include a passive material and are used to keep the first coil 115 and the second coil 120 an appropriate distance 207 apart. In one embodiment, the spacers 205a, 205b include an insulating material having a second height 210 of approximately 2 mm. In the illustrated embodiment, the spacers 205a, 205b use a microcellular urethane material by the name of PORON®. In other embodiments, the spacers 205a, 205b may use other type of insulating material. The distance 207 between the first coil 115 and the second coil 120 is not arbitrary, and is determined based on, for example, the geometry of the first coil 115, the geometry of the second coil 120, the number of turns in the first coil 115, the number of turns in the second coil 120, and the like.

Figure 3A:
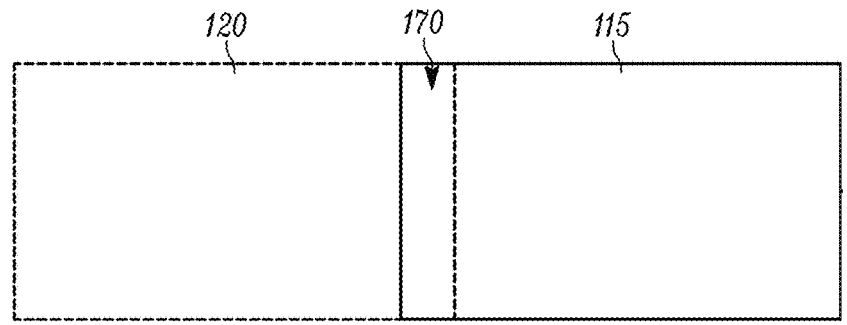
FIGS. 3A through 3D are diagrams of different configurations of a transmitter coil and a repeater coil of the wireless power transfer device of FIGS. 2A through 2B.
Figure 3B:
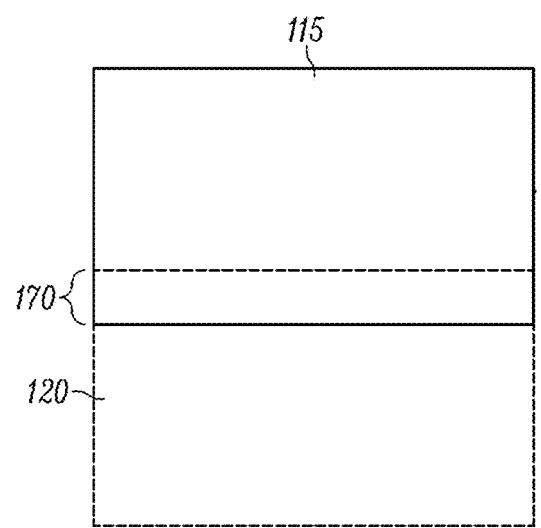
Figure 3C:
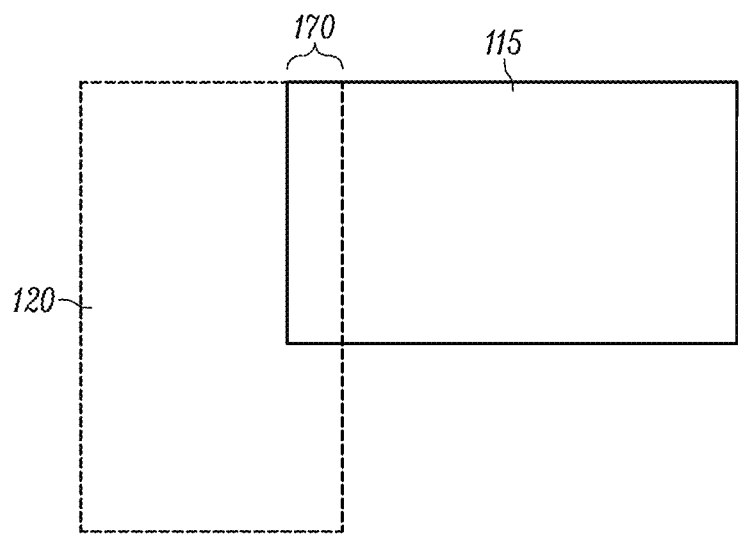
Figure 3D:
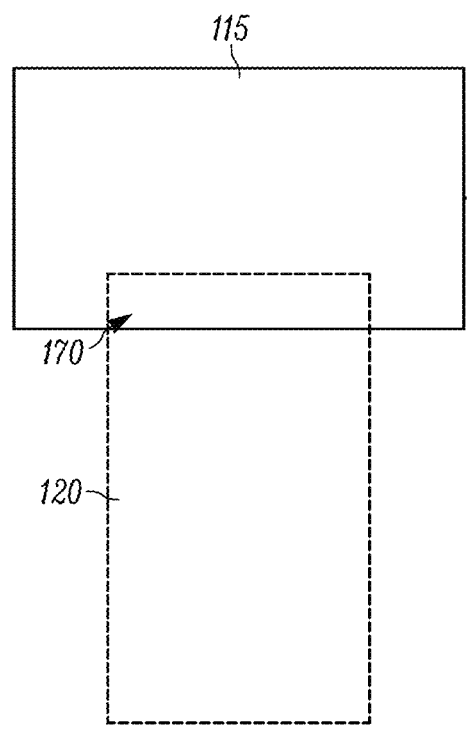

FIG. 3A shows the configuration of the overlap region 170 as described above with respect to FIGS. 2A and 2B. However, the overlap region 170 may be shaped and sized differently than the size and shape shown in FIGS. 2A and 2B. FIGS. 3B through 3D illustrate variations of the overlap region 170 and configurations of the first portion 150 of the first coil 115 and the second portion 165 of the second coil 120.

FIG. 3B shows the first portion 150 of the first coil 115 located along the first length 140 of the first coil 115, and the second portion 165 of the second coil 120 located along the second length 155 of the second coil 120. Therefore, the overlap region 170 shown in FIG. 3B is positioned along the first length 140 of the first coil 115 and the second length 155 of the second coil 120.

In contrast, FIG. 3C illustrates the first portion 150 of the first coil 115 positioned along the first width 145 of the first coil 115, and the second portion 165 of the second coil 120 located along the second length 155 of the second coil 120. In FIG. 3C, the overlap region 170 is positioned along the first width 145 of the first coil 115, and along the second length 155 of the second coil 120, thereby forming an L shaped overlap region 170.

FIG. 3D illustrates the first portion 150 of the first coil 115 positioned along the first length 140 of the first coil 115, and the second portion 165 of the second coil 120 positioned along the second width 160 of the second coil 120. In FIG.

3D, the overlap region 170 is positioned along the first length 140, and along the second width 160, thereby forming a T shaped overlap region 170. Variations beyond those shown in FIGS. 3A through 3D are possible. For example, the first coil 115 as shown in FIG. 3C can be positioned centrally with respect to the second coil 120 such that a sideways T shape is formed instead of an L shape.

In some applications, it may be desired to enlarge a power transfer area of the wireless power transfer device 105 to, for example, provide greater flexibility on where to place the external device 110 for power transfer and/or provide the ability to transfer power to multiple external devices. Typically, the power transfer area is enlarged by expanding the size of a transmitter coil (i.e., the coil transmitting power from the wireless power transfer device 105). However, enlarging the power transfer area by expanding the size of a transmitter coil may lead to a mismatch of the size and form factor of the transmitter coil and the receiver coil 113 of the external device 110. The wireless power transfer device 105 shown in FIG. 1, however, uses the first coil 115, the second coil 120, and the switch network 125 to effectively enlarge the power transfer area of the wireless power transfer device 105 while minimizing the effects of a mismatch of the size or the form factor between a transmitter coil of the wireless power transfer device 105 (e.g., the first coil 115 or the second coil 120).

As noted above with respect to FIG. 1, the first coil 115 and the second coil 120 are electrically coupled to the switch network 125 and the switch network 125 is electrically coupled to the power amplifier 130. FIGS. 4A through 4D illustrate various configurations of the switch network 125. The switch network 125 includes a plurality of switches to selectively detune the first coil 115, the second coil 120, or neither. As shown in FIGS. 4A through 4D, the switch network 125 includes a first power switch 300, a second power switch 305, a first detuning component 310, a second detuning component 315, a first detuning switch 320, and a second detuning switch 325. In some embodiments, the switch network 125 may include more or less switches and/or detuning components. For example, in some embodiments, the wireless power transfer device 105 may include more than two coils (e.g., a third coil), in which case the switch network 125 may also include additional switches and detuning components than the ones shown in FIGS. 4A through 4D.

The first power switch 300 selectively electrically couples the first coil 115 to the power amplifier 130. The second power switch 305 selectively electrically couples the second coil 120 to the power amplifier 130. The first power switch 300 and the second power switch 305 are each switchable between a conducting state, in which the power amplifier 130 is electrically coupled to the first coil 115, and the second coil 120, respectively, and a non-conducting state, in which the power amplifier 130 is electrically decoupled (e.g., disconnected) from the first coil 115, and the second coil 120, respectively.

The first detuning component 310 is selectively electrically coupled to the first coil 115 through the first detuning switch 320. The first detuning switch 320 is switchable between a conducting state in which the first coil 115 is electrically coupled to the first detuning component 310, and a non-conducting state in which the first coil 115 is decoupled (e.g., disconnected) from the first detuning component 310. When the first detuning component 310 is electrically coupled to the first coil 115 (i.e., when the first detuning switch 320 is in the conducting state), the first detuning component 310 changes the resonant frequency of the first coil 115, which decreases the operability of the first coil 115 to transfer power to the external device 110. Therefore, when the first detuning component 310 is coupled to the first coil 115, the first detuning component 310 detunes the first coil 115. In some embodiments, the first detuning component 310 may change another characteristic of the first coil 115 and/or the magnetic field generated by the first coil 115 that decreases the operability of the first coil 115 to transfer power. In the illustrated embodiment, the first detuning component 310 includes a detuning capacitor. In other embodiments, other electrical components may be used that, when electrically coupled to the first coil 115, detune the first coil 115.

The second detuning component 315 is selectively electrically coupled to the second coil 120 through the second detuning switch 325. The second detuning switch 325 is switchable between a conducting state in which the second coil 120 is electrically coupled to the second detuning component 315, and a non-conducting state in which the second coil 120 is decoupled (e.g., disconnected) from the second detuning component 315. When the second detuning component 315 is electrically coupled to the second coil 120 (i.e., when the second detuning switch 325 is in the conducting state), the second detuning component 315 changes the resonant frequency of the second coil 120, or changes another characteristic of the second coil 120 and/or the magnetic field generated by the second coil 120 such that the operability of the second coil to transfer power is decreased. Therefore, when the second detuning component 315 is coupled to the second coil 20, the second detuning component 315 detunes the second coil 120. In the illustrated embodiment, the second detuning component 315 includes a detuning capacitor. Components other than a capacitor may be used to detune the second coil 120.

Figure 4A:
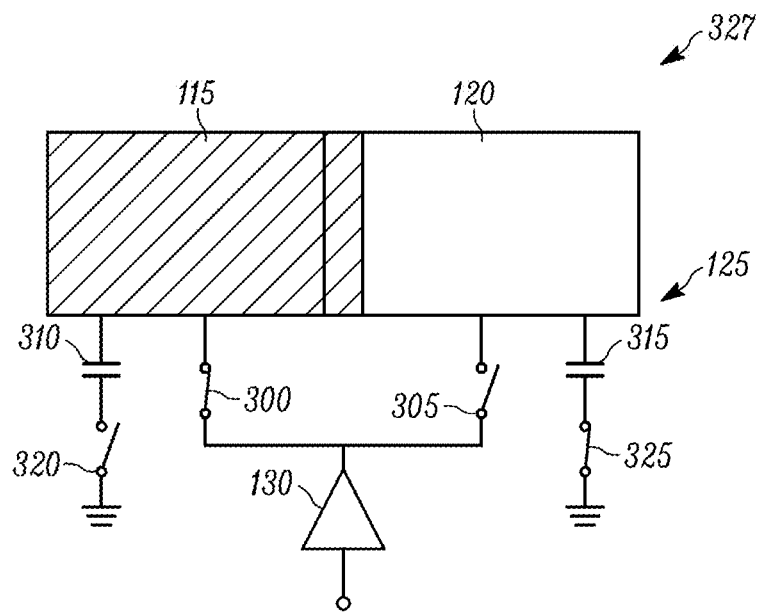
FIGS. 4A through 4D are diagrams illustrating different configurations of a switch network of the wireless power transfer device of FIGS. 2A through 2B.

Based on a state of the first and second power switches 300 and 305 and the first and second detuning switches 320 and 325, the switch network 125 selectively connects the power amplifier 130 to one of the first coil 115, or the second coil 120. As shown in FIGS. 4A through 4D, the switch network 125 can be placed in four different configurations. FIG. 4A illustrates a first configuration 327 of the switch network 125 in which the first power switch 300 is in the conducting state, the first detuning switch 320 is in the non-conducting state, the second power switch 305 is in the non-conducting state, and the second detuning switch 325 is in the conducting state. In the first configuration 327, the power amplifier 130 is electrically coupled to the first coil 115 while the second coil 120 is detuned via the second detuning component 315. Therefore, the power amplifier 130 provides the drive signal to the first coil 115, and only the first coil 115 generates a magnetic field to transfer power to the receiver coil 113 of the external device 110. In the first configuration 327, the first coil 115 is the transmitter coil (i.e., the coil receiving a drive signal from the power amplifier and, in response to the drive signal, generating the magnetic field to transfer power to the receiver coil 113) of the wireless power transfer device 105.

Figure 4B:
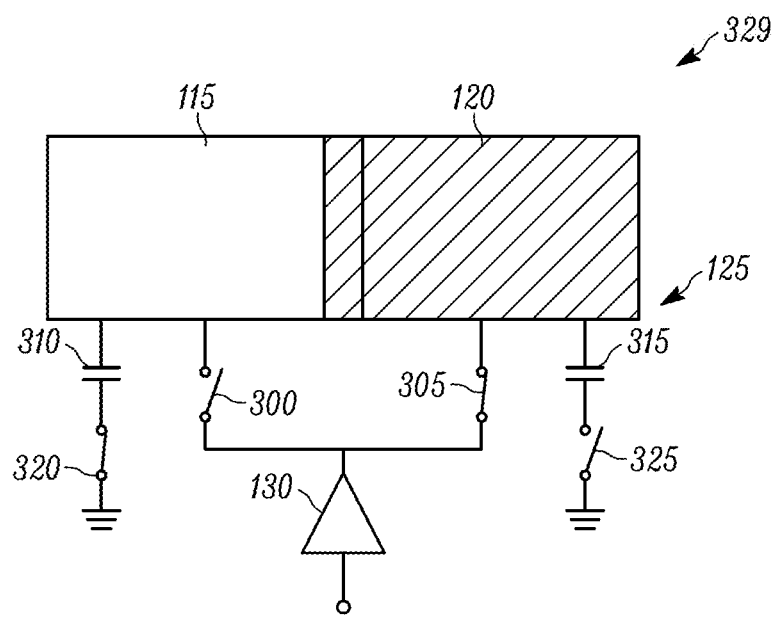

FIG. 4B illustrates a second configuration 329 of the switch network 125 in which the first power switch 300 and the second detuning switch 325 are in the non-conducting state, and the first detuning switch 320 and the second power switch 305 are in the conducting state. In the second configuration 329, the power amplifier 130 is electrically coupled to the second coil 120 while the first coil 115 is detuned via the first detuning component 310. Therefore, the power amplifier 130 provides the drive signal to the second coil 120, and only the second coil 120 generates a magnetic field to transfer power to the receiver coil 113 of the external device 110. In the second configuration 329, the second coil 120 is the transmitter coil (i.e., the coil receiving a drive signal from the power amplifier and, in response to the drive signal, generating the magnetic field to transfer power to the receiver coil 113) of the wireless power transfer device 105. When the switch network 125 is in the first configuration 327 or the second configuration 329, only one of the coils (e.g., the first coil 115 or the second coil 120) generates a magnetic field and transfers power to the external device 110 (e.g., is the transmitter coil). Therefore, when the switch network 125 operates in either the first configuration 327 or the second configuration 329, the switch network 125 is said to operate in an individual configuration in which either the first coil 115 or the second coil 120 is detuned.

Figure 4C:
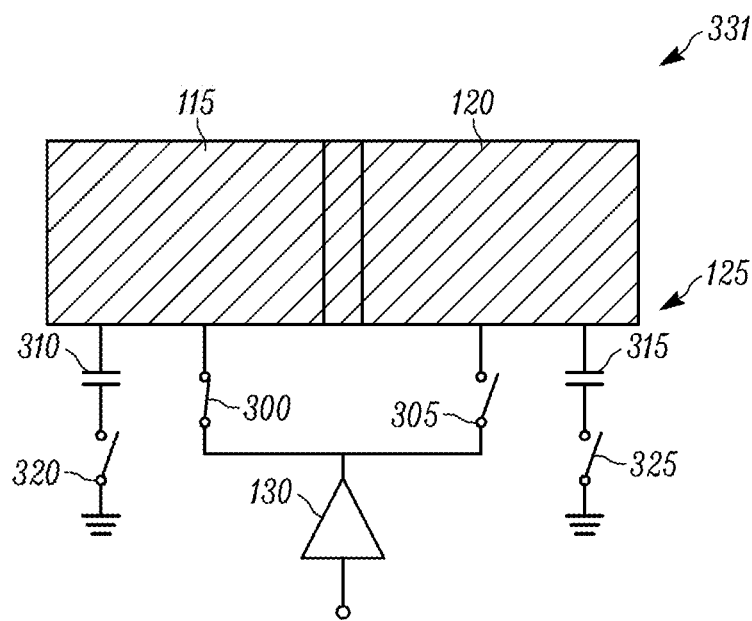

FIG. 4C illustrates a third configuration 331 of the switch network 125 in which the first power switch 300 is in the conducting state, while the second power switch 305, the first detuning switch 320, and the second detuning switch 325 are in the non-conducting state. In the third configuration 331, the power amplifier 130 is electrically coupled to the first coil 115 and provides the drive signal to the first coil 115, which in response to receiving the drive signal, generates a first magnetic field. The second coil 120, since it is magnetically coupled to the first coil 115 and decoupled from the second detuning component 315, generates a second magnetic field in response to the first coil 115 generating the first magnetic field. While the switch network 125 is in the third configuration 331, both the first coil 115 and the second coil 120 transfer power to the external device 110, even though only the first coil 115 receives the drive signal from the power amplifier 130. In other words, while the switch network 125 is in the third configuration, the first coil 115 behaves as a transmitter coil (e.g., because the first coil 115 receives the drive signal from the power amplifier 130 and, in response, generates a first magnetic field), while the second coil 120 behaves as a repeater coil (i.e., a coil that is magnetically coupled to a transmitter coil and that generates a magnetic field in response to the transmitter coil generating a magnetic field).

Figure 4D:
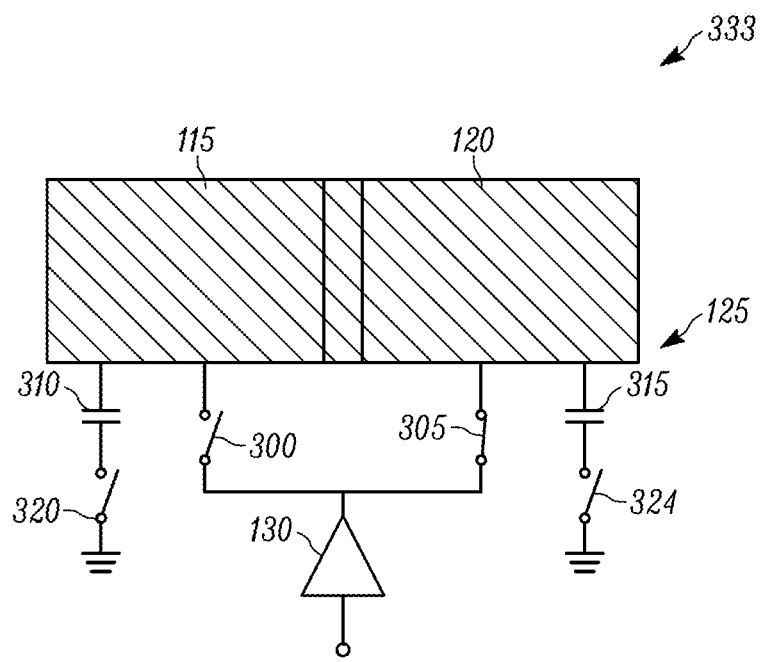

FIG. 4D illustrates a fourth configuration 333 of the switch network 125 in which the second power switch 305 is in the conducting state while the first power switch 300, the first detuning switch 320, and the second detuning switch 325 are in the non-conducting state. In the fourth configuration 333, the power amplifier 130 is electrically coupled to the second coil 120 and provides the drive signal to the second coil 120, which generates a magnetic field in response to receiving the drive signal. The first coil 115, since it is magnetically coupled to the second coil 120 and decoupled from the first detuning component 310, generates another magnetic field in response to the second coil 120 generating the magnetic field. Therefore, while the switch network 125 is in the fourth configuration 333, both the first coil 115 and the second coil 120 transfer power to the external device 110, even though only the second coil 120 receives the drive signal from the power amplifier 130. In other words, while the switch network 125 is in the fourth configuration 333, the second coil 120 behaves as a transmitter coil (e.g., because the second coil 120 receives the drive signal from the power amplifier 130 and, in response, generates a magnetic field), while the first coil 115 behaves as a repeater coil (i.e., because the first coil 115 is magnetically coupled to a transmitter coil (e.g., the second coil 120) and generates a magnetic field in response to the transmitter coil generating a magnetic field). When the switch network 125 operates in the third configuration 331 or the fourth configuration 333 both the first coil 115 and the second coil 120 generate a magnetic field, and both the first coil 115 and the second coil 120 can perform a power transfer operation (i.e., transfer power to the external device 110). Therefore, when the switch network 125 operates in either the third configuration 331 or the fourth configuration 333, the switch network 125 is said to operate in a combined configuration in which both the first coil 115 and the second coil 120 are tuned and can transfer power to the external device 110.

Figure 5A:
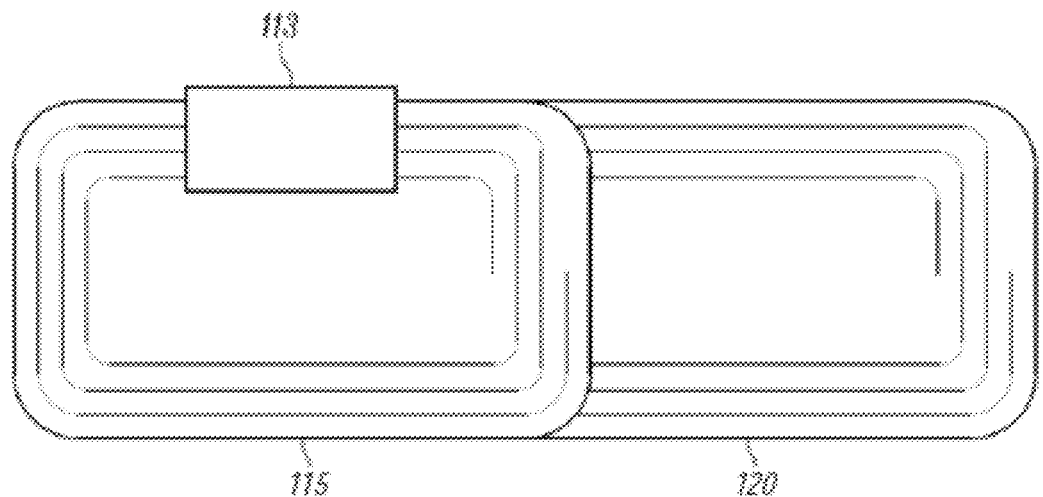
FIGS. 5A through 5D are diagrams illustrating different positions of a receiver coil with respect to the wireless power transfer device of FIGS. 2A through B.
Figure 5B:
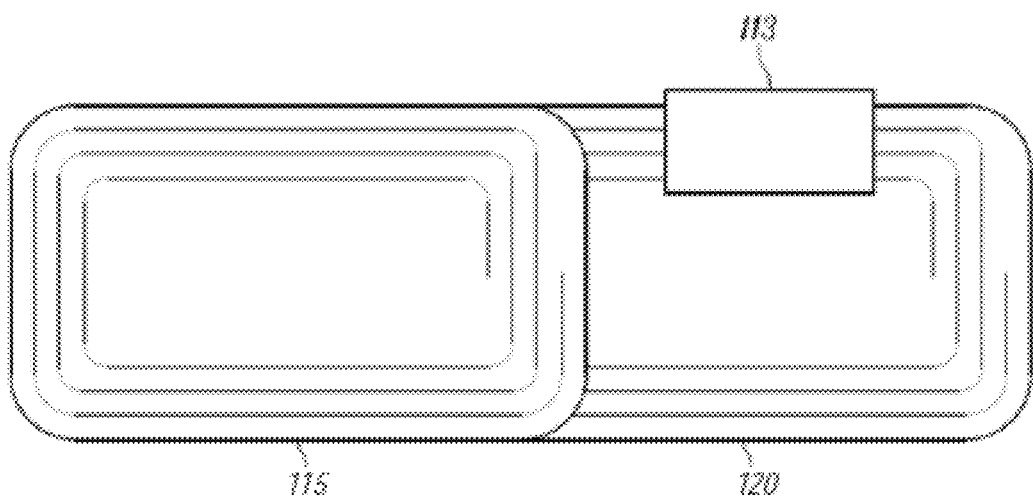
Figure 5C:
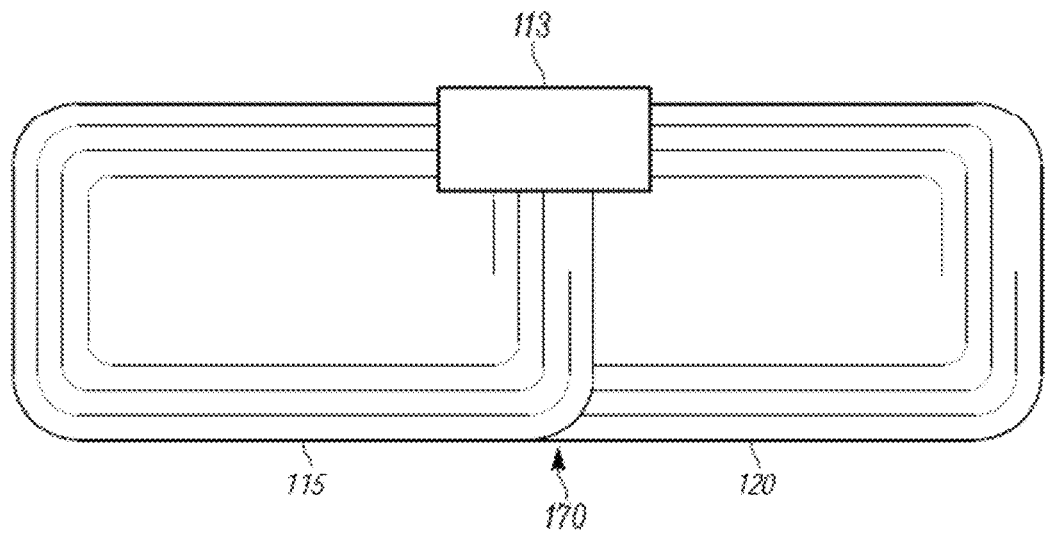
Figure 5D:
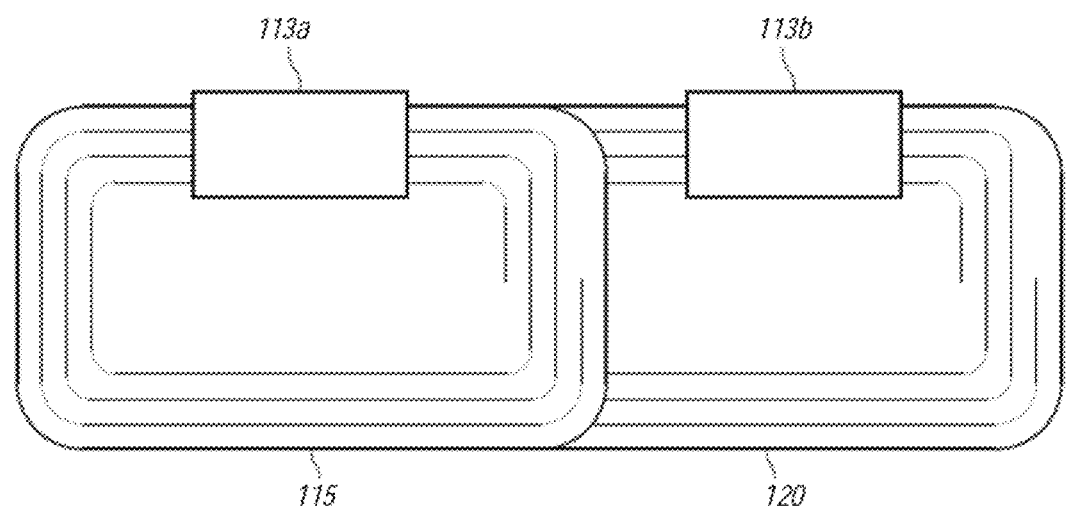

As shown in FIG. 1, the switch network 125 is electrically coupled to the electronic processor 135. The electronic processor 135 controls the state of each of the switches 300, 305, 320 and 325 in the switch network 125. In the illustrated embodiment, the electronic processor 135 determines which configuration to place the switch network 125 in based on a position of the receiver coil 113. As shown in FIGS. 5A through 5D, one or more receiver coils 113 can be coupled to the wireless power transfer device 105. FIG. 5A shows a single receiver coil 113 positioned closest to the first coil 115. FIG. 5B shows a single receiver coil 113 positioned closest to the second coil 120. FIG. 5C shows a single receiver coil 113 positioned closest to the overlap region 170. FIG. 5D shows a first receiver coil 113a positioned closest to the first coil 115 and a second receiver coil 113b positioned closest to the second coil 120. The receiver coil 113, the first receiver coil 113a, or the second receiver coil 113b are positioned "closest" to the first coil 115, the second coil 120, or the overlap region 170 relative to other positions of the receiver coil 113, the first receiver coil 113, or the second receiver coil 113b with respect to the wireless power transfer device 105. In other words, a receiver coil 113 may be positioned anywhere on a surface of the wireless power transfer device 105. While the receiver coil 113 remains on the surface of the wireless power transfer device 105, the receiver coil 113 may be positioned closer to, for example, the first coil 115, relative to the second coil 120 and relative to the overlap region 170.

When a single receiver coil 113 is positioned closest to the first coil 115, as shown in FIG. 5A, and the switch network 125 is in a combined configuration (i.e., both the first coil 115 and the second coil 120 transfer power), the power transferred by the second coil 120 remains unused because there is no external device positioned to receive the power from the second coil 120. Accordingly, the overall efficiency at which power is transferred from the wireless power transfer device 105 decreases when both the first coil 115 and the second coil 120 generate a magnetic field, but the receiver coil 113 is positioned to receive wireless power from only the first coil 115. To reduce the loss of power and increase the power transfer efficiency in such situations, the electronic processor 135 detects that only one receiver coil 113 is coupled to the wireless power transfer device 105, detects the position of the receiver coil 113, and places the switch network 125 in the appropriate individual configuration based on whether the receiver coil 113 is positioned closest to the first coil 115 or the second coil 120. Analogously, when two receiver coils 113a and 113b are coupled to the wireless power transfer device 105, as shown for example in FIG. 5D, but only the first coil 115 or the second coil 120 generates a magnetic field to transfer power, the overall power transfer efficiency also decreases. Therefore, the electronic processor 135 places the switch network 125 in a combined configuration when multiple receiver coils 113a, 113b (FIG. 5D) are coupled to the wireless power transfer device 105, thereby increasing the power transfer efficiency.

The electronic processor 135 determines the position of the receiver coil 113 based on a first impedance associated with the first coil 115 and on a second impedance associated with the second coil 120. The impedance associated with the first coil 115 and the impedance associated with the second coil 120 refer to the apparent opposition in an electrical circuit to the flow of current. When the receiver coil 113 approaches the first coil 115 (e.g., the receiver coil 113 magnetically couples to the first coil 115 because the external device 110 is placed closest to the first coil 115 relative to the second coil 120 and the overlap region 170, as shown in FIG. 5A), the first impedance associated with the first coil 115 decreases. Similarly, when the receiver coil 113 approaches the second coil 120 (e.g., the receiver coil 113 magnetically couples to the second coil 120 because the external device 110 is placed closest to the second coil 120 relative to the first coil 115 and the overlap region 170, as shown in FIG. 5B), the second impedance associated with the second coil 120 decreases. The electronic processor 135 monitors changes in the first impedance associated with the first coil 115 and the second impedance associated with the second coil 120. Detecting a change in the first impedance associated with the first coil 115 and/or the second impedance associated with the second coil 120 serves as an indication to the electronic processor 135 of the relative position of the receiver coil 113. After the electronic processor 135 determines the position of the receiver coil 113, the electronic processor 135 controls the switch network 125 (i.e., controls the plurality of switches of the switch network 125) to place the switch network 125 in the first configuration 327, the second configuration 329, the third configuration 331, or the fourth configuration 333.

In the illustrated embodiment, when the electronic processor 135 determines that the receiver coil 113 is positioned closest to the first coil 115 relative to the second coil 120 and the overlap region 170 (FIG. 5A), the electronic processor 135 places the switch network 125 in the first configuration 327 (shown in FIG. 4A). When the electronic processor 135 determines that the receiver coil 113 is positioned closest to the second coil 120 relative to the first coil 115 and the overlap region 170, as shown in FIG. 5B, the electronic processor 135 places the switch network 125 in the second configuration 329 (shown in FIG. 4B). When the electronic processor 135 determines that the receiver coil 113 is positioned closest to the overlap region 170 relative to the first coil 115 and the second coil 120 (as shown in FIG. 5C), or that multiple receiver coils 113a, 113b are coupled to the wireless power transfer device 105 (as shown in FIG. 5D), the electronic processor 135 places the switch network 125 in either the third configuration 331 or the fourth configuration 333.

Figure 6:
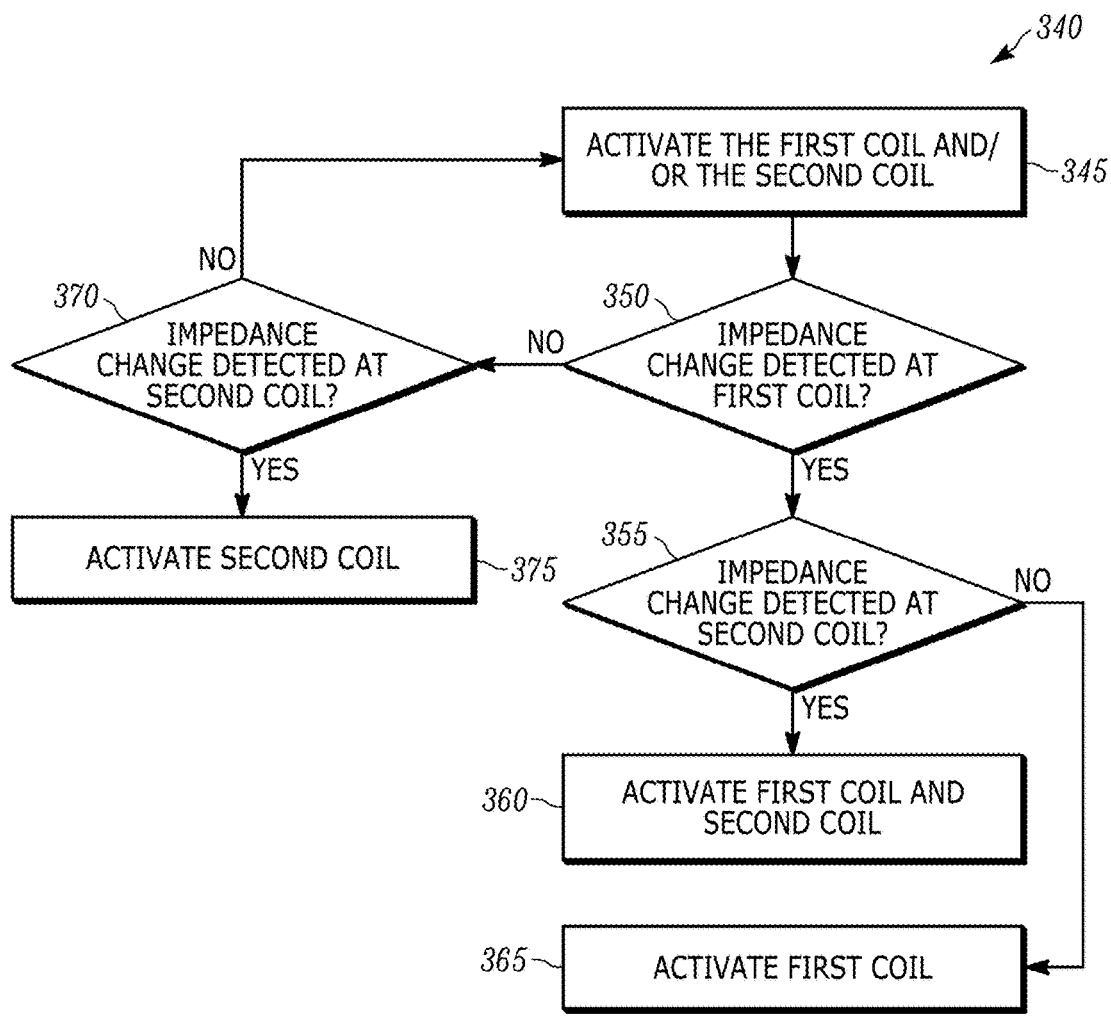
FIG. 6 is a flowchart illustrating a method of determining a configuration for the switch network based on a position of a receiver coil.

FIG. 6 illustrates an exemplary method 340 implemented by the electronic processor 135 to determine the configuration for the switch network 125 based on a position of the receiver coil 113 (e.g., whether the receiver coil 113 is positioned closest to the first coil 115, the second coil 120, or the overlap region 170). As shown in FIG. 6, the electronic processor 135 monitors a parameter of the first coil 115 and the second coil 120. As discussed above, in the embodiment illustrated in FIGS. 1 through 6, the electronic processor 135 monitors the first impedance associated with the first coil 115 and the second impedance associated with the second coil 120. In some embodiments, the electronic processor 135 may, additionally or alternatively, monitor other parameters associated with the first coil 115 and second coil 120 that help determine the relative position of the receiver coil 113. As shown in FIG. 6, the electronic processor 135 periodically activates (e.g., by providing the drive signal from the power amplifier 130) the first coil 115 and/or the second coil 120 (block 345). Periodically powering the first coil 115 and the second coil 120 allows the electronic processor 135 to detect changes in the first impedance associated with the first coil 115 and the second impedance associated with the second coil 120. The electronic processor 135 monitors the first impedance associated with the first coil 115 and determines whether a first impedance change indicative of a decrease in the first impedance of the first coil 115 is detected by the electronic processor 135 (block 350). When the electronic processor 135 detects a change in the first impedance associated with the first coil 115 (e.g., a monitored parameter), the electronic processor 135 then determines whether a second impedance change indicative of a decrease in the second impedance associated with the second coil 120 is also detected (block 355). If the electronic processor 135 detects the second impedance change at block 355 (i.e., detects both the first impedance change and the second impedance change), the electronic processor 135 activates both the first coil 115 and the second coil 120 (block 360) by placing the switch network 125 in a combined configuration (i.e., in either the third configuration 331 or the fourth configuration 333). The electronic processor 135 may detect a first impedance change and a second impedance change when the receiver coil 113 is positioned closest to the overlap region 170 (as shown in FIG. 5C), or when a first receiver coil 113a is positioned closest to the first coil 115 and a second receiver coil 113b is positioned closest to the second coil 120 (as shown in FIG. 5D). Referring back to block 355, if the second impedance change is not detected (i.e., processor detects only the first impedance change), the electronic processor 135 activates only the first coil 115 to transfer power (block 365) by placing the switch network 125 in the first configuration 327. The electronic processor 135 may detect the first impedance change, but not the second impedance change when the receiver coil 113 is positioned closest to the first coil 115 relative to the second coil 120 and the overlap region 170.

With reference to block 350, if the first impedance change is not detected (i.e., the electronic processor 135 does not detect the first impedance change), the electronic processor 135 determines whether a second impedance change indicative of a decrease in the second impedance of the second coil 120 is detected (block 370). If the electronic processor 135 detects the second impedance change (i.e., only detects the second impedance change, but not the first impedance change), the electronic processor 135 activates only the second coil 120 for power transfer (block 375) by placing the switch network 125 in the second configuration 329. The electronic processor 135 may detect the second impedance change, but not the first impedance change when the receiver coil 113 is positioned closest to the second coil 120 relative to the first coil 115 and the overlap region 170. If, however, the second impedance change is not detected at block 370 (i.e., the electronic processor 135 does not detect the first impedance change or the second impedance change), the electronic processor 135 returns to block 345 to periodically activate the first coil 115 and the second coil 120 and thereby continue to monitor the first impedance associated with the first coil 115 and the second impedance associated with the second coil 120 for detection of an approaching receiver coil 113.

By controlling the switch network 125 based on a detected position of the receiver coil 113 determined at least in part by a monitored parameter of a power transfer operation (e.g., first impedance associated with the first coil 115 or second impedance associated with the second coil 120), the wireless power transfer device 105 may effectively change the size of the wireless power transfer area to maximize the power transfer efficiency. In other words, and as discussed above, the wireless power transfer device 105 can activate a smaller wireless power transfer area (e.g., by activating only the first coil 115 or the second coil 120) when a single receiver coil 113 is coupled to the wireless power transfer device 105, and can activate an enlarged power transfer area (e.g., by activating both the first coil 115 and the second coil 120) when, for example, multiple receiver coils 113a, 113b are coupled to the wireless power transfer device 105.

Figure 7:
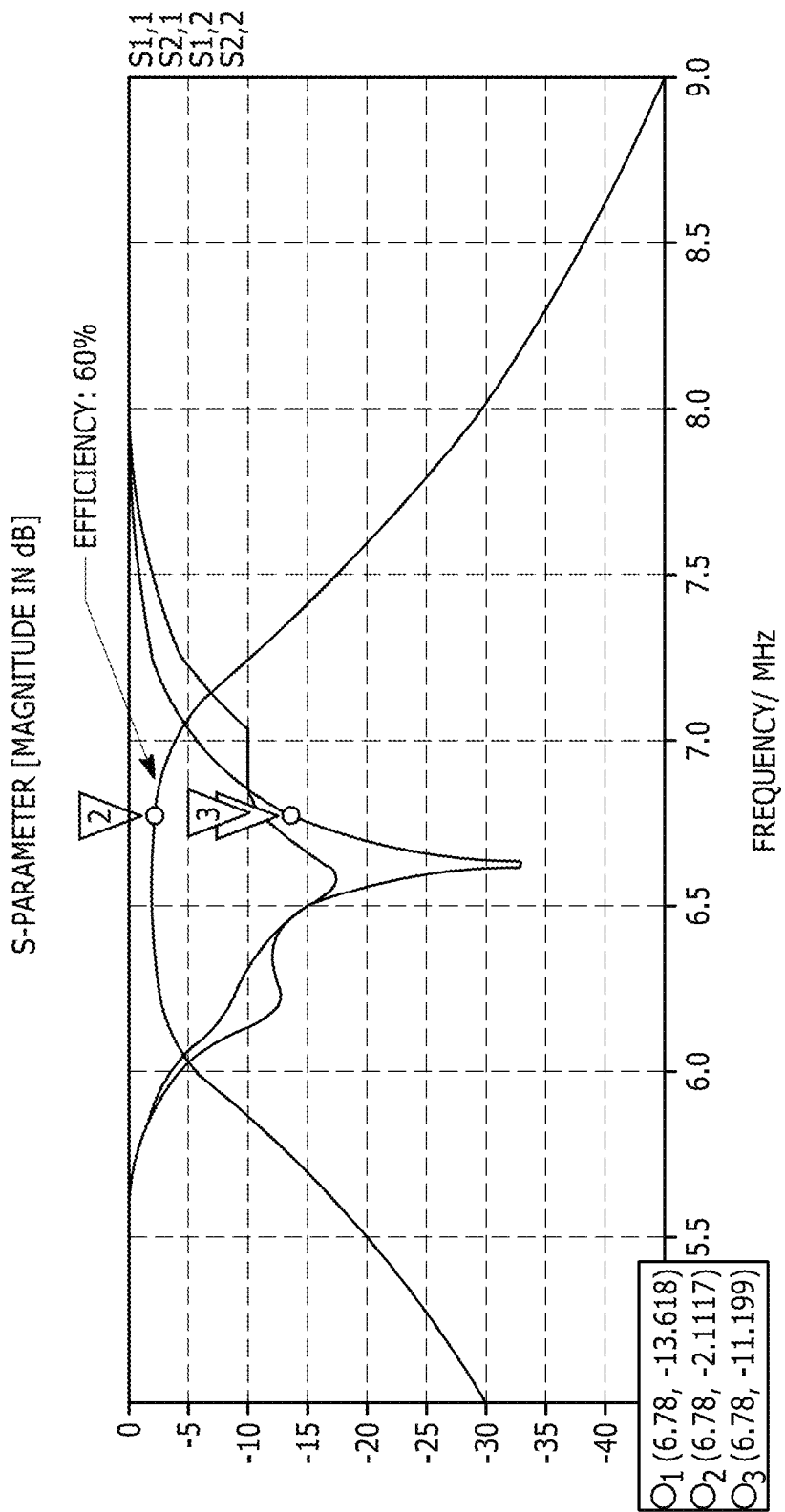
FIG. 7 is a graph illustrating an exemplary power transfer efficiency when a single receiver coil is coupled to the wireless power transfer device of FIGS. 2A through 2B and the wireless power transfer device does not detune a first coil of the wireless power transfer device.

Additionally, detuning the first coil 115 or the second coil 120 when only a single receiver coil 113 is coupled to the wireless power transfer device 105 also increases the power transfer efficiency of the wireless power transfer device 105 when performing a power transfer operation. FIG. 7 illustrates a graph showing one example of the power transfer efficiency (e.g., a monitored efficiency) when a single receiver coil 113 is coupled to the wireless power transfer device 105 as shown in FIG. 5B, and the wireless power transfer device 105 does not detune the first coil 115. As shown on the graph, the power transfer efficiency is approximately equal to sixty percent (60%). However, when the single receiver coil 113 is coupled to the wireless power transfer device 105 as shown in FIG. 5B again and the switch network 125 detunes the first coil 115, the power transfer efficiency increases to approximately seventy percent (70%). Therefore, by detuning the first coil 115 or the second coil 120, whichever is farthest from the receiver coil 113, the wireless power transfer device 105 can achieve a greater power transfer efficiency.

Figure 8:
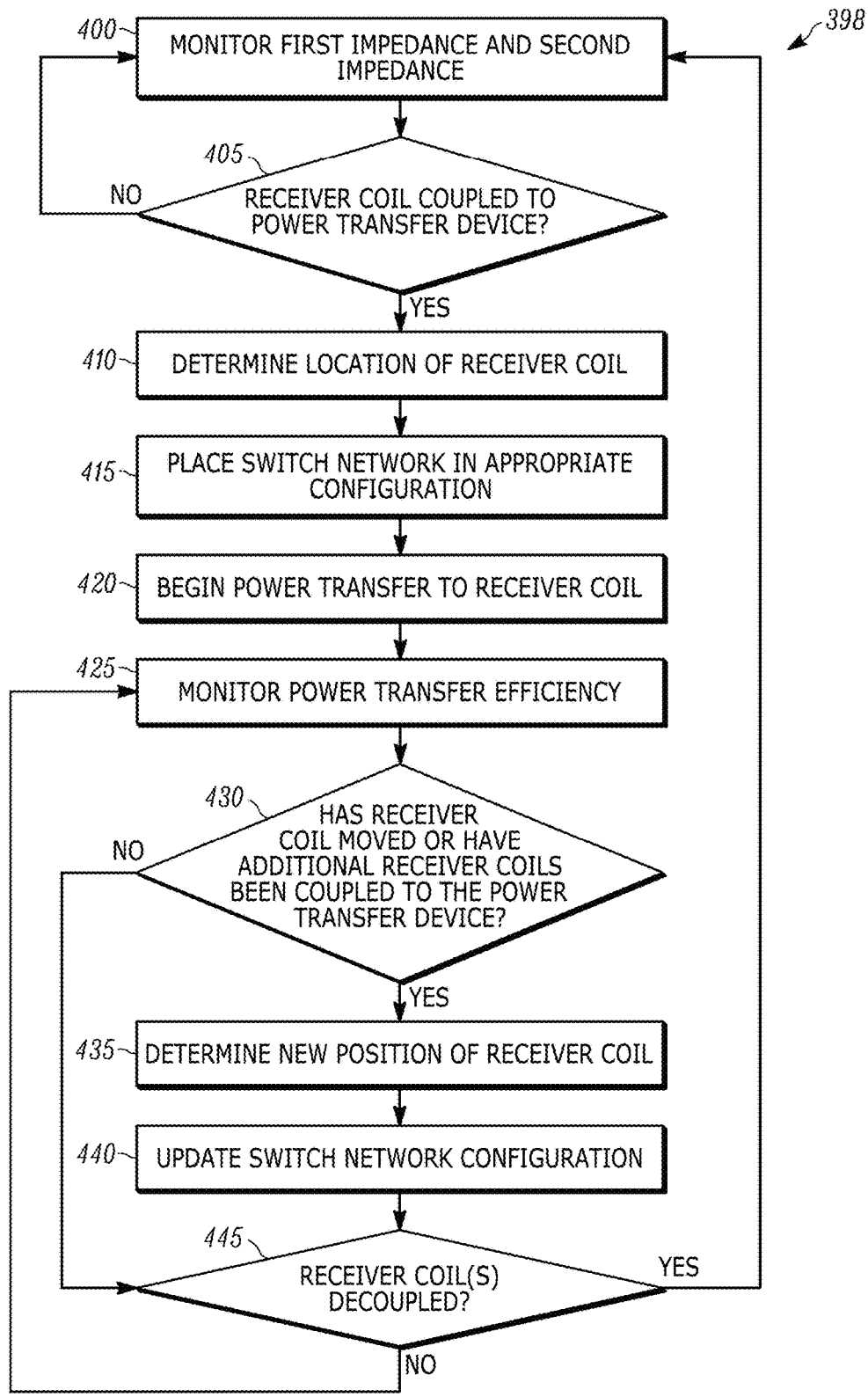
FIG. 8 is a flowchart illustrating the overall operation of the wireless power transfer device of FIGS. 2A through 2B.

To maintain an increased power transfer efficiency, the electronic processor 135 continues to track the position of the external device 110 even after the electronic processor 135 detects the initial position of the receiver coil 113 (as shown in FIG. 6) and after power transfer has initiated. FIG. 8 is a flowchart illustrating the overall operation of the wireless power transfer device 105. The electronic processor 135 monitors the first impedance associated with the first coil 115 and second impedance associated with the second coil 120 (block 400). The electronic processor 135 determines whether a receiver coil 113 is coupled to the wireless power transfer device 105 based on the monitored impedance (block 405). While the electronic processor 135 does not detect that a receiver coil 113 has coupled to the wireless power transfer device 105, the electronic processor 135 continues to monitor the first impedance associated with the first coil 115 and the second impedance associated with the second coil 120 (block 400). As discussed above, the electronic processor 135 monitors the first impedance associated with the first coil 115 and the second impedance associated with the second coil 120 by periodically and selectively activating the first coil 115 and the second coil 120. When, on the other hand, the electronic processor 135 detects that a receiver coil 113 has coupled to the wireless power transfer device 105, the electronic processor 135 determines the location of the receiver coil 113 at block 410 (i.e., determines whether the receiver coil 113 is positioned closest to the first coil 115, the second coil 120, or the overlap region 170). As discussed above, the electronic processor 135 determines the location of the receiver coil 113 based on the detected first impedance associated with the first coil 115 and second impedance associated with the second coil 120. Thereby, the electronic processor 135 determines whether the receiver coil 113 is placed nearest the first coil 115, nearest the second coil 120, nearest the overlap region 170, and/or if multiple receiver coils 113a, 113b are coupled to the wireless power transfer device 105.

Once the electronic processor 135 determines the location of the receiver coil 113, the electronic processor 135 places the switch network 125 in the appropriate configuration corresponding to the determined location of the receiver coil 113 (block 415). The wireless power transfer device 105 begins power transfer to the receiver coil 113 (block 420). While the wireless power transfer device 105 is transferring power to the receiver coil 113, the electronic processor 135 monitors the power transfer efficiency (e.g., an efficiency parameter of a power transfer operation) at block 425. Based on the power transfer efficiency (e.g., a monitored parameter of the power transfer operation), and changes thereof, the electronic processor 135 may determine whether the receiver coil 113 has moved (e.g., from being nearest the first coil 115 to being nearest the second coil 120) and/or whether another receiver coil (e.g., a second receiver coil 113b) has been coupled to the wireless power transfer device 105 (block 430). If the electronic processor 135 determines that the receiver coil 113 has moved or that another receiver coil has coupled to the wireless power transfer device 105, the electronic processor 135 determines the new position of the receiver coil 113 and/or any additional receiver coils (block 435). The electronic processor 135 then updates the configuration of the switch network 125, if necessary, after the location of the receiver coil(s) 113 is determined (block 440) and proceeds to block 445. If, on the other hand, the electronic processor 135 determines that the receiver coil 113 has not moved and no additional receiver coils have been coupled to the wireless power transfer device 105, the electronic processor 135 jumps to block 445.

At block 445, the electronic processor 135 also determines whether or when the receiver coil(s) 113 are decoupled from the wireless power transfer device 105 (e.g., removed from the wireless power transfer device 105). When the electronic processor 135 determines that the receiver coil(s) 113 have been decoupled from the wireless power transfer device 105, the electronic processor 135 returns to monitoring the first impedance associated with the first coil 115 and the second impedance associated with the second coil 120 to detect when a receiver coil 113 couples to the wireless power transfer device 105 (block 400). If, on the other hand, the electronic processor 135 determines that the receiver coil(s) 113 are still coupled to the wireless power transfer device 105, then the electronic processor 135 continues to monitor the power transfer efficiency to track the movement of the receiver coil(s) 113 while power transfer occurs (block 425).

Figure 9A:
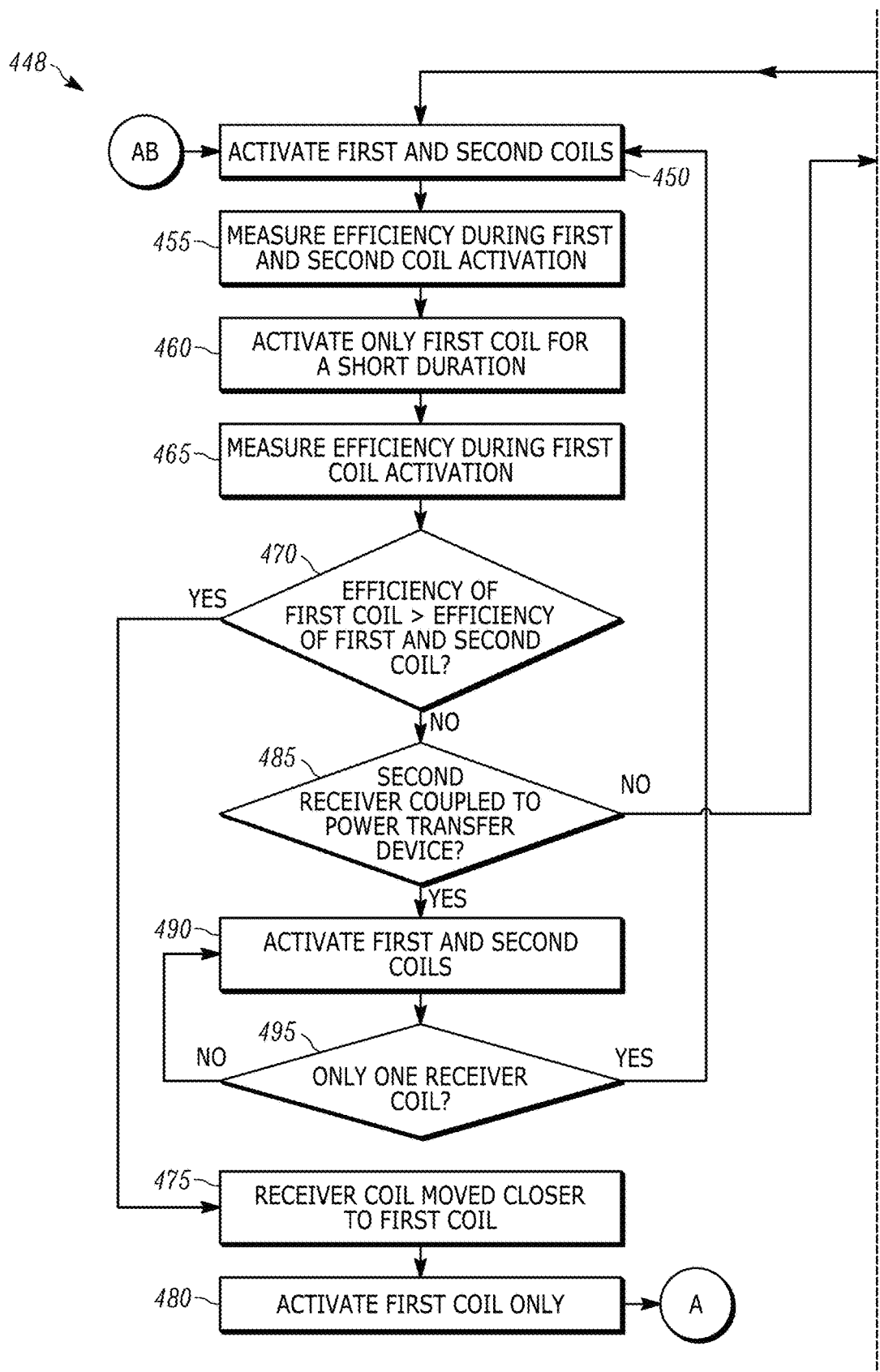
FIGS. 9A and 9B together are a flowchart illustrating a method of tracking the receiver coil when the receiver coil is positioned closest to an overlap region of the wireless power transfer device of FIGS. 2A through 2B.
Figure 9B:
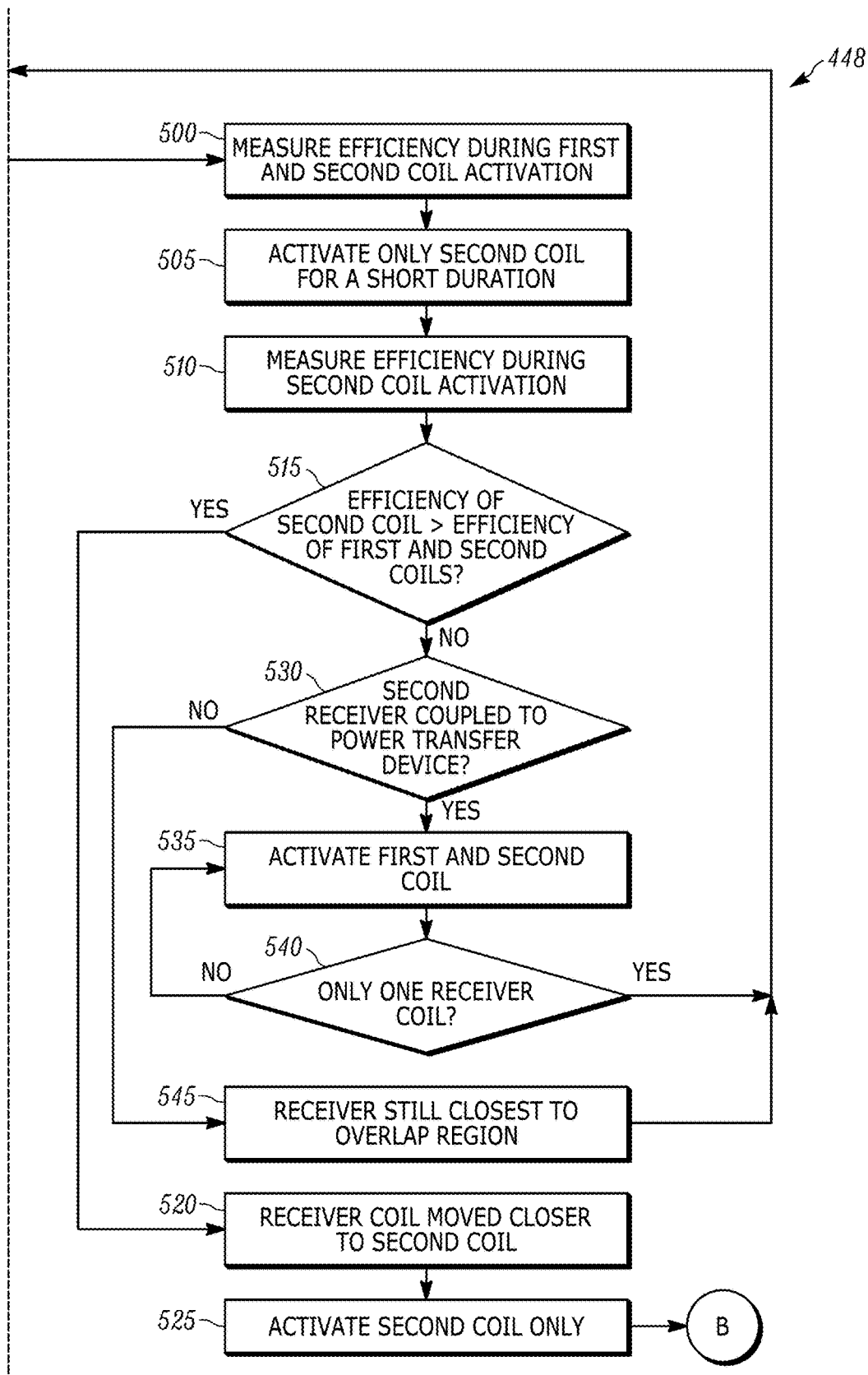
Figure 10:
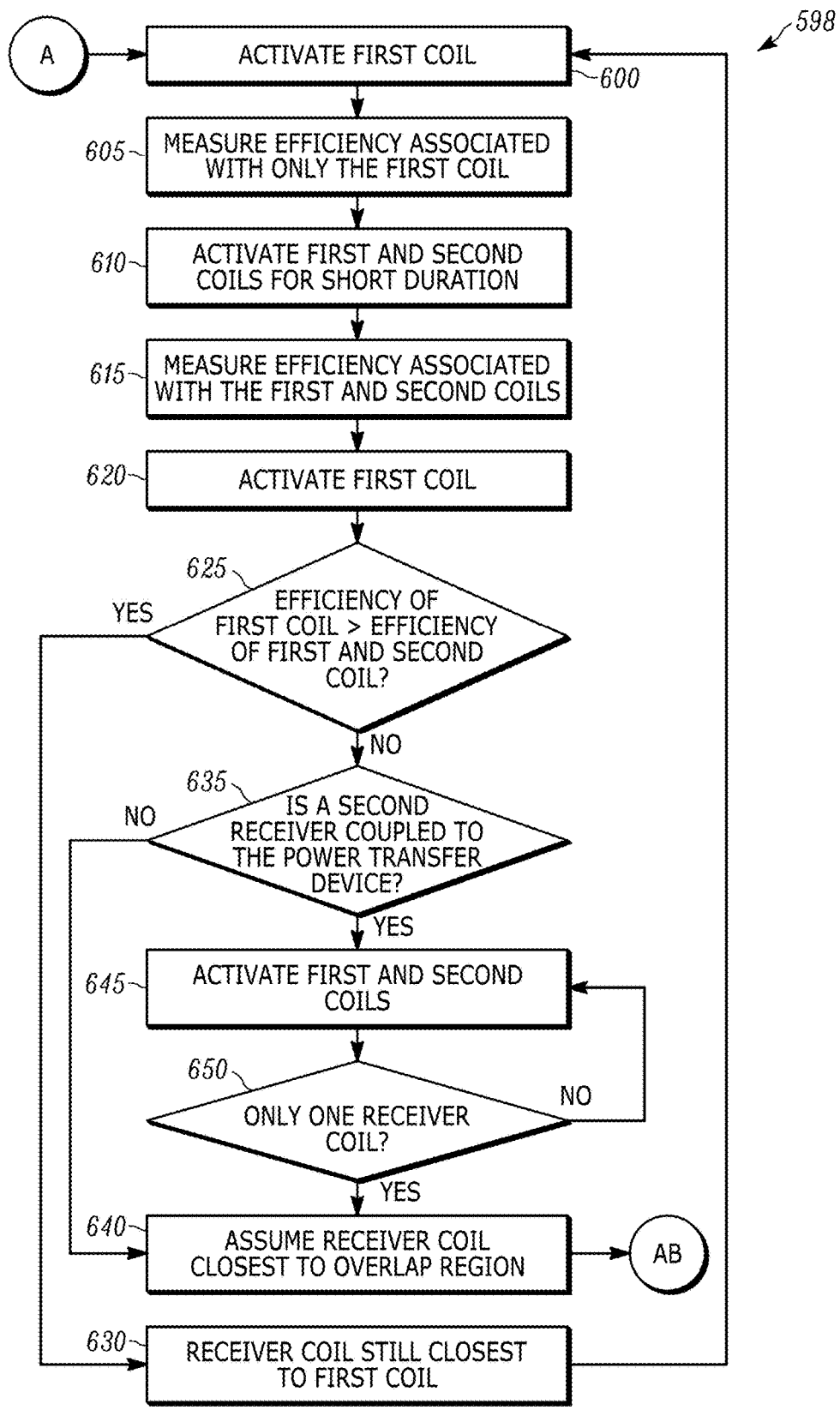
FIG. 10 is a flowchart illustrating a method of tracking the receiver coil when the receiver coil is positioned closest to a first coil of the wireless power transfer device of FIGS. 2A through B.
Figure 11:
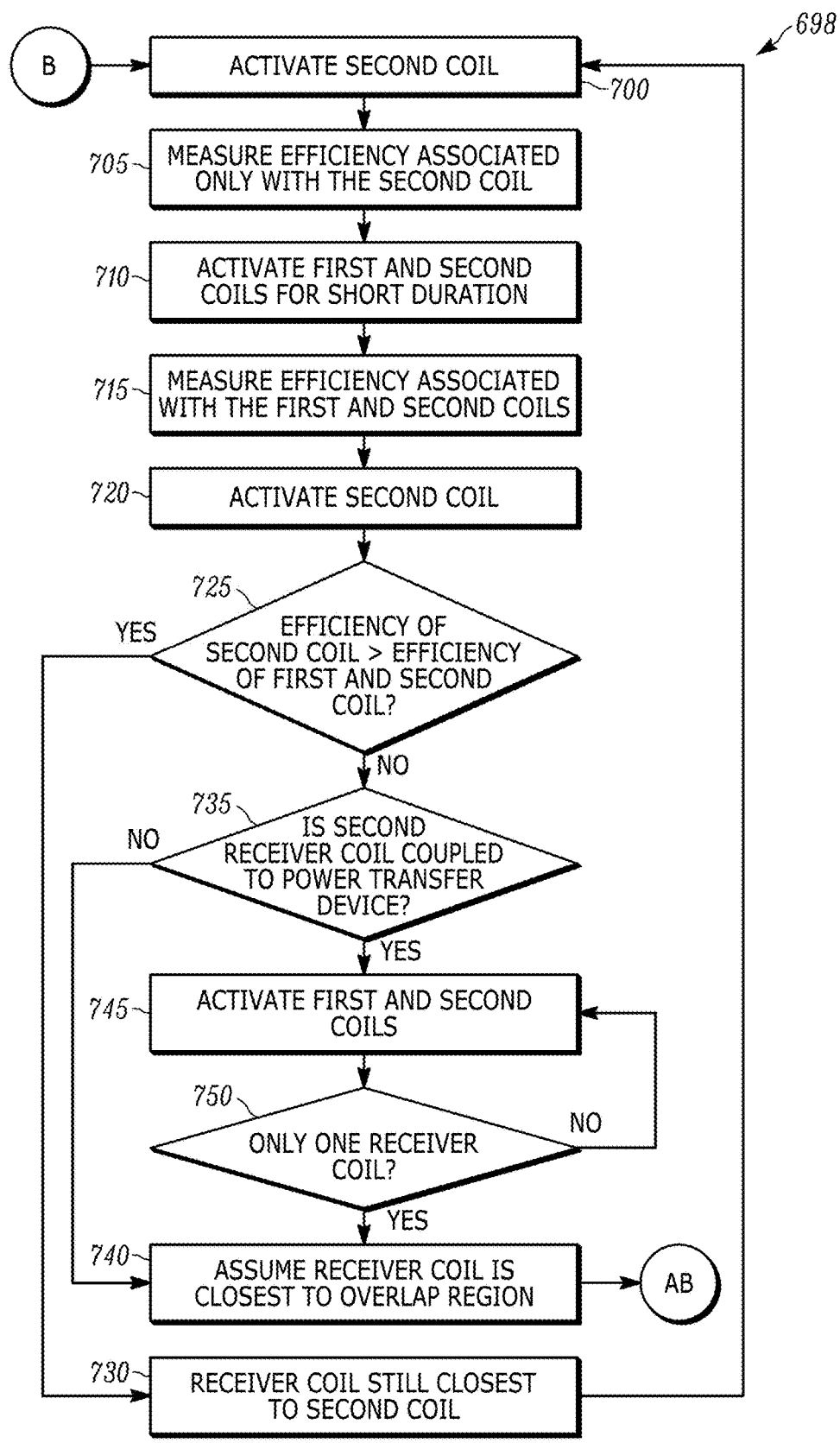
FIG. 11 is a flowchart illustrating a method of tracking the receiver coil when the receiver coil is positioned closest to a second coil of the wireless power transfer device of FIGS. 2A through B.

As shown in FIG. 8, the electronic processor 135 monitors the power transfer efficiency of the power transfer operation performed by the wireless power transfer device 105, and determines, based on the power transfer efficiency, whether the receiver coil 113 has moved and/or whether a second receiver coil has been coupled to the wireless power transfer device 105. FIG. 9 through FIG. 11 provide more details regarding the methods implemented by the electronic processor 135 to monitor the power transfer efficiency and track the movement of the receiver coil 113 based on the monitored power transfer efficiency. FIG. 9A and FIG. 9B together illustrate a method 448 of tracking the receiver coil 113 when the receiver coil 113 starts by being positioned closest to the overlap region 170 of the wireless power transfer device 105. The method 448 is implemented by the electronic processor 135 when the electronic processor 135, based on the first impedance associated with the first coil 115 and the second impedance associated with the second coil 120, determines that the receiver coil 113 is positioned closest to the overlap region 170. Since the electronic processor 135 determines that the receiver coil 113 is nearest the overlap region 170, the electronic processor 135 activates the first coil 115 and the second coil 120 by placing the switch network in a combined configuration (block 450). The electronic processor 135 measures the power transfer efficiency when both the first coil 115 and the second coil 120 are activated (block 455). To monitor the power transfer efficiency, the electronic processor 135 then activates only the first coil 115 for a short duration (i.e., detunes the second coil 120 for the short duration) at block 460. The electronic processor 135 measures the power transfer efficiency when only the first coil 115 is activated (e.g., during the duration that only the first coil 115 is activated) at block 465. The electronic processor 135 then compares the power transfer efficiencies by determining whether the power transfer efficiency associated with only the first coil 115 (e.g., a first transfer efficiency) is greater than the power transfer efficiency associated with both the first coil 115 and the second coil 120 (e.g., a second power transfer efficiency) at block 470.

If the electronic processor 135 determines that the power transfer efficiency associated with only the first coil 115 is greater than the power transfer efficiency associated with both the first coil 115 and the second coil 120, the electronic processor 135 determines that the receiver coil 113 has moved to be closer to the first coil 115 relative to the second coil 120 and the overlap region 170 (block 475), and activates the first coil 115 only (block 480) by placing the switch network 125 in the first configuration 327. If, on the other hand, the electronic processor 135 determines that the power transfer efficiency associated with both the first coil 115 and the second coil 120 being activated is greater than the power transfer efficiency associated with only the first coil 115 being activated, the electronic processor 135 then proceeds to determine whether a second receiver coil has been coupled to the wireless power transfer device 105 (block 485). The electronic processor 135 determines that a second receiver coil has been coupled to the wireless power transfer device by comparing a current power transfer efficiency with a previously measured power transfer efficiency. When a second receiver coil is coupled to the wireless power transfer device 105, the power transfer efficiency decreases significantly. Therefore, by comparing a previous power transfer efficiency with the currently measured power transfer efficiency, the electronic processor 135 determines that a second receiver coil has coupled to the wireless power transfer device 105 when the electronic processor 135 detects a decrease in the currently measured power transfer efficiency relative to a previous power transfer efficiency.

If the electronic processor 135 determines that a second receiver coil has coupled to the wireless power transfer device 105, the electronic processor 135 continues to activate both the first coil 115 and the second coil 120 (block 490) by maintaining the switch network 125 in a combined configuration 331, 333. The electronic processor 135 then continues to monitor the power transfer efficiency to determine whether the number of receiver coils coupled to the power transfer device 105 has reduced and only one receiver coil 113 remains coupled to the wireless power transfer device 105 (block 495). If the electronic processor 135 determines that only one receiver coil 113 is coupled to the wireless power transfer device 105, the electronic processor 135 returns to block 450 to continue tracking the position of the receiver coil 113 by monitoring the power transfer efficiency and thereby determine an appropriate configuration for the switch network 125. If, however, the electronic processor 135 determines that multiple receiver coils are still coupled to the wireless power transfer device 105, the electronic processor 135 continues to activate the first coil 115 and the second coil 120 (block 490) by maintaining the switch network in a combined configuration.

Referring back to block 485, if the electronic processor 135 determines that no additional receiver coils have coupled to the wireless power transfer device 105, the electronic processor 135 measures the power transfer efficiency when both the first coil 115 and the second coil 120 are activated (block 500). The electronic processor 135 then activates only the second coil 120 for a short duration (i.e., detunes the first coil 115 for the short duration) at block 505. The electronic processor 135 proceeds to measure the power transfer efficiency while only the second coil 120 is activated (block 510). The electronic processor 135 then compares the power transfer efficiency when both the first coil 115 and the second coil 120 are activated with the power transfer efficiency when only the second coil 120 is activated by determining whether the power transfer efficiency associated with only the second coil 120 is greater than the power transfer efficiency associated with both the first coil 115 and the second coil 120 (block 515).

If the electronic processor 135 determines that the power transfer efficiency when only the second coil 120 is activated is greater than the power transfer efficiency when both the first coil 115 and the second coil 120 are activated, then the electronic processor 135 determines that the receiver coil 113 has moved to be closer to the second coil 120 relative to the first coil 115 and the overlap region 170 (block 520), and activates only the second coil 120 (block 525) by placing the switch network 125 in the second configuration 329. If, on the other hand, the electronic processor 135 determines that the power transfer efficiency when both the first coil 115 and the second coil 120 are activated is greater than the power transfer efficiency when only the second coil 120 is activated, the electronic processor 135 proceeds to determine whether a second receiver coil has been coupled to the wireless power transfer device 105 (block 530). The electronic processor 135 determines that a second receiver coil has coupled to the power transfer device 105 by comparing a currently measured power transfer efficiency with a previously measured power transfer efficiency, as discussed above with respect to block 485.

If the electronic processor 135 determines that a second receiver coil has coupled to the wireless power transfer device 105, the electronic processor 135 continues to activate both the first coil 115 and the second coil 120 (block 535) by maintaining the switch network 125 in a combined configuration. The electronic processor 135 then continues to monitor the power transfer efficiency to determine whether the number of receiver coils coupled to the power transfer device 105 has reduced to one and only one receiver coil 113 is coupled to the power transfer device 105 (block 540). If the electronic processor 135 determines that only one receiver coil 113 is coupled to the wireless power transfer device 105, the electronic processor 135 returns to block 450 to track the position of the receiver coil 113 by monitoring the power transfer efficiency. If, however, the electronic processor 135 determines that multiple receiver coils are still coupled to the wireless power transfer device 105, the electronic processor 135 continues to activate the first coil 115 and the second coil 120 (block 535) by maintaining the switch network 125 in a combined configuration 331, 333. Referring back to block 530, if the electronic processor 135 determines that no additional receiver coils have coupled to the power transfer device 105, the electronic processor 135 determines that the receiver coil 113 remains closest to the overlap region 170 relative to the first coil 115 and the second coil 120 (block 545), and returns to block 450 to activate both the first coil 115 and the second coil 120.

By monitoring the power transfer efficiency, the electronic processor 135 tracks the position of the receiver coil 113 and adjusts the configuration of the switch network 125 to maximize the power transfer efficiency and ensure the power is evenly distributed over a surface of the wireless power transfer device 105. The electronic processor 135 also determines whether additional receiver coils are coupled to the power transfer device 105 by monitoring the power transfer efficiency. FIG. 10 illustrates a method 598 of tracking the receiver coil 113 when the receiver coil 113 starts positioned closest to the first coil 115 of the wireless power transfer device 105 relative to the second coil 120 and the overlap region 170. The method 598 is implemented by the electronic processor 135 when the electronic processor 135, based on the first impedance associated with the first coil 115 and the second impedance associated with the second coil 120, determines that the receiver coil 113 is positioned closest to the first coil 115. Since the electronic processor 135 determines that the receiver coil 113 is closest to the first coil 115, the electronic processor 135 activates the first coil 115 only by placing the switch network in the first configuration 327 (block 600). Notably, when the electronic processor 135 determines, while tracking the receiver coil 113, that the receiver coil 113 moved closer to the first coil 115, as described in, for example, block 475, the electronic processor 135 jumps to block 600 and implements the method 598 described below. The electronic processor 135 measures the power transfer efficiency when only the first coil 115 is activated (block 605). To monitor the power transfer efficiency, the electronic processor 135 then activates both the first coil 115 and the second coil 120 for a short duration (block 610). The electronic processor 135 proceeds to measure the power transfer efficiency while both the first coil 115 and the second coil 120 are activated (block 615). The electronic processor 135 then returns the switch network 125 to the first configuration 327 such that only the first coil 115 is activated (block 620). The electronic processor 135 compares the power transfer efficiency associated with both the first coil 115 and the second coil 120 to the power transfer efficiency associated with only the first coil 115 by determining whether the power transfer efficiency associated with the first coil 115 is greater than the power transfer efficiency associated with the first coil 115 and the second coil 120 (block 625).

If the electronic processor 135 determines that the power transfer efficiency associated with only the first coil 115 is greater than the power transfer efficiency associated with both the first coil 115 and the second coil 120, the electronic processor 135 determines that the receiver coil 113 remains positioned closest to the first coil 115 (block 630). The electronic processor 135 then continues to monitor the power transfer efficiency by periodically activating both the first coil 115 and the second coil 120 and measuring the power transfer efficiency (block 600 through block 625). If, however, the electronic processor 135 determines that the power transfer efficiency associated with both the first coil 115 and the second coil 120 is greater than the power transfer efficiency when only first coil 115 is activated, the electronic processor 135 proceeds to determine whether a second receiver coil has been coupled to the wireless power transfer device 105 (block 635). If the electronic processor 135 determines that no additional receiver coils have been coupled to the wireless power transfer device 105, the electronic processor 135 assumes the receiver coil 113 has moved such that it is positioned closest to the overlap region 170 (block 640), which guides the electronic processor 135 to block 450 of FIG. 9A.

In other embodiments, the electronic processor 135 does not assume that the receiver coil 113 has moved closest to the overlap region 170. Instead, the electronic processor 135 measures the power transfer efficiency when only the first coil 115 is activated, measures the power transfer efficiency when only the second coil 120 is activated, and measures the power transfer efficiency when both the first coil 115 and the second coil 120 are activated. By comparing the three power transfer efficiencies, each associated with a different combination of the first coil 115 and the second coil 120 being activated, the electronic processor 135 may determine the position of the receiver coil 113 (e.g., whether the receiver coil 113 is positioned closest to the first coil 115, the second coil 120, or the overlap region 170).

Referring back to block 635, if the electronic processor 135 determines that an additional receiver coil 113 has been coupled to the wireless power transfer device 105, the electronic processor 135 activates both the first coil 115 and the second coil 120 by placing the switch network 125 in a combined configuration (block 645). Then the electronic processor 135 continues to monitor the power transfer efficiency to determine whether the number of receiver coils coupled to the power transfer device 105 has reduced to one and determines whether only one receiver coil 113 is coupled to the wireless power transfer device 105 (block 650). When the electronic processor 135 determines that only one receiver coil 113 is coupled to the wireless power transfer device 105, the electronic processor 135 assumes that the receiver coil 113 is positioned closest to the overlap region 170 (block 640) and returns to block 450 of FIG. 9A to determine the position of the receiver coil 113 more accurately. When, however, the electronic processor 135 determines that multiple receiver coils are still coupled to the wireless power transfer device 105, the electronic processor 135 continues to activate the first coil 115 and the second coil 120 by maintaining the switch network 125 in a combined configuration (block 645).

FIG. 11 illustrates the method 698 of tracking the receiver coil 113 when the receiver coil 113 starts positioned closest to the second coil 120 of the wireless power transfer device 105 relative to the first coil 115 and the overlap region 170. The method 698 is implemented by the electronic processor 135 when the electronic processor 135, based on the first impedance associated with the first coil 115 and the second impedance associated with the second coil 120, determines that the receiver coil 113 is positioned closer to the second coil 120 than the first coil 115 or the overlap region 170. Since the electronic processor 135 determines that the receiver coil 113 is closest to the second coil 120, the electronic processor 135 activates only the second coil 120 by placing the switch network 125 in the second configuration 329 (block 700). Notably, when the electronic processor 135 determines, while tracking the receiver coil 113, that the receiver coil 113 moved closer to the second coil 120 relative to the first coil 115 and the overlap region 170, as described, for example, in block 475 of FIG. 9A, the electronic processor 135 jumps to block 700 and implements the method 698 as described below. The electronic processor 135 measures the power transfer efficiency when only the second coil 120 is activated (block 705). To monitor the power transfer efficiency, the electronic processor 135 then activates both the first coil 115 and the second coil 120 for a short duration (block 710). The electronic processor 135 then measures the power transfer efficiency while both the first coil 115 and the second coil 120 are activated (block 715). The electronic processor 135 returns the switch network 125 to the second configuration 329 such that only the second coil 120 is activated (block 720). The electronic processor 135 proceeds to compare the power transfer efficiency when both the first coil 115 and the second coil 120 are activated with the power transfer efficiency when only the second coil 120 is activated by determining whether the power transfer efficiency associated with the second coil 120 is greater than the power transfer efficiency associated with the first coil 115 and second coil 120 (block 725).

If the electronic processor 135 determines that the power transfer efficiency when only the second coil 120 is activated is greater than the power transfer efficiency when both the first coil 115 and the second coil 120 are activated, the electronic processor 135 determines that the receiver coil 113 remains positioned closest to the second coil 120 relative to the first coil 115 and the overlap region 170 (block 730). The electronic processor 135 continues to monitor the power transfer efficiency by periodically activating both the first coil 115 and the second coil 120 and measuring the power transfer efficiency (block 700 through block 725). When, however, the electronic processor 135 determines that the power transfer efficiency when both the first coil 115 and the second coil 120 are activated is greater than the power transfer efficiency when only the second coil 120 is activated, the electronic processor 135 proceeds to determine whether a second receiver coil has been coupled to the wireless power transfer device 105 (block 735). When the electronic processor 135 determines that no additional receiver coils have been coupled to the wireless power transfer device 105, the electronic processor 135 assumes that the receiver coil 113 has moved to be nearest the overlap region 170 (block 740), which prompts to electronic processor 135 to return to block 450 of FIG. 9A. When, on the other hand, the electronic processor 135 determines that an additional receiver coil 113 has been coupled to the wireless power transfer device 105, the electronic processor 135 activates the first coil 115 and the second coil 120 (block 745) by placing the switch network 125 in a combined configuration.

Then, the electronic processor 135 continues to monitor the power transfer efficiency to determine when only one receiver coil 113 remains coupled to the wireless power transfer device 105 (block 750). When the electronic processor 135 determines that only one receiver coil 113 is coupled to the wireless power transfer device 105, the electronic processor 135 assumes that the receiver coil 113 is positioned nearest the overlap region 170 (block 740), and returns to block 450 of FIG. 9A to determine the position of the receiver coil 113 more accurately. When, on the other hand, the electronic processor 135 determines that multiple receiver coils are still coupled to the wireless power transfer device 105, the electronic processor 135 maintains the switch network 125 in a combined configuration such that both the first coil 115 and the second coil 120 remain activated (block 745).

Typically, in wireless power transfer systems and devices, impedance of the receiver coil 113 and the transmitter coil (e.g., first coil 115, second coil 120, or both), are matched to inhibit reflections at the ends of either the receiver coil 113 or the transmitter coil (e.g., first coil 115, second coil 120, or both). Impedance matching circuitry is often included in wireless power transfer systems to match the impedance of the transmitter coil (e.g., first coil 115, second coil 120, or both) and the receiver coil 113. The wireless power transfer device 105, on the other hand, as described above provides a physical configuration of a first coil 115 and a second coil 120 that improves the power transfer efficiency of the wireless power transfer device 105 in each physical configuration. The first coil 115 and the second coil 120 of the wireless power transfer device 105 terminate at 50 Ohms in each of the four configurations (e.g., the first configuration 327, the second configuration 329, the third configuration 331, and the fourth configuration 333) of the switch network 125, without incorporating impedance matching circuitry. For example, when the switch network 125 is in the first configuration 327, the first coil 115 is terminated at 50 Ohms without including impedance matching circuitry. When the switch network 125 is in the second configuration 329, the second coil 120 is terminated at 50 Ohms, without including impedance matching circuitry. When the switch network 125 is in the third configuration 331 or the fourth configuration 333, both the first coil 115 and the second coil 120, in combination, are terminated at 50 Ohms, without including impedance matching circuitry.

Figure 12:
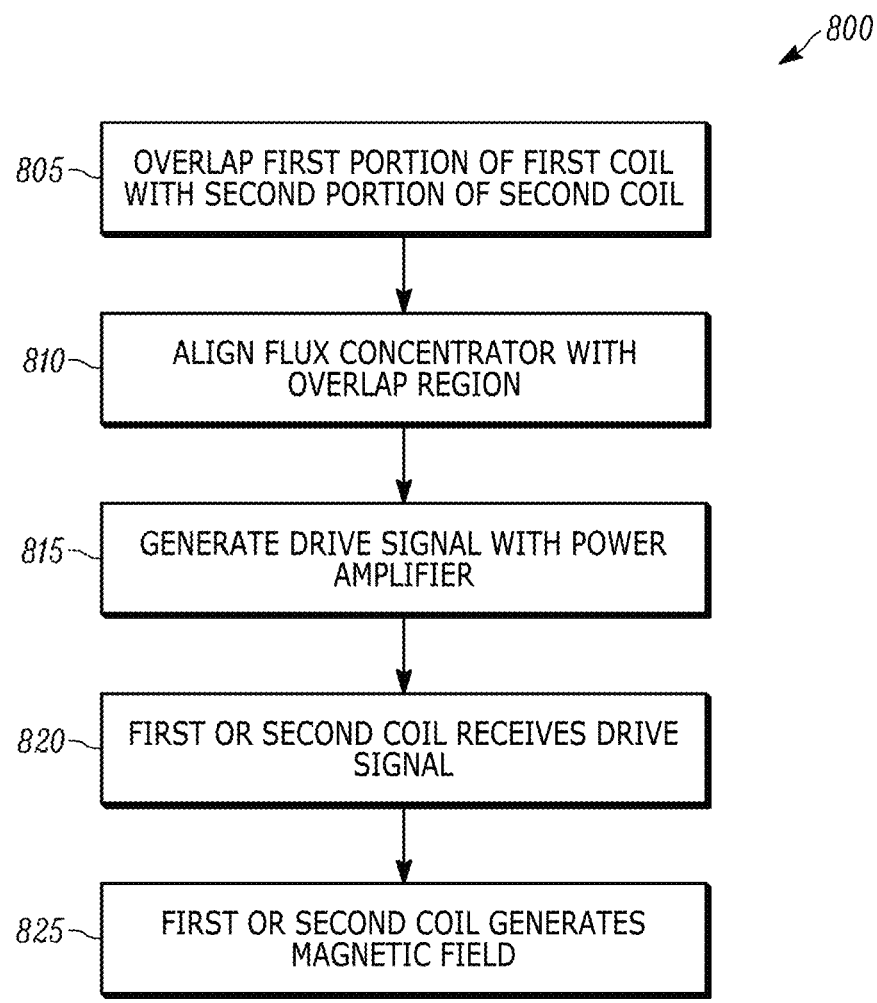
FIG. 12 is a flowchart illustrating a method of enlarging a power transfer area of a wireless power transfer device.

Additionally, the wireless power transfer device 105 includes an enlarged power transfer area, as compared to a wireless power transfer device 105 that includes only the first coil 115. FIG. 12 illustrates a method 800 of enlarging the power transfer area of a wireless power transfer device 105. As shown in FIG. 12, the method 800 includes overlapping a first portion 150 of the first coil 115 with a second portion 165 of the second coil 120 to form an overlap region 170 (block 805). The method 800 also includes aligning the flux concentrator 195 with the overlap region 170 (block 810). As shown in FIG. 2B, the flux concentrator 195 is positioned below the second coil 120 in the illustrated embodiment. A power amplifier 130 is then used to generate a drive signal (block 815). Based on the configuration of the switch network 125, the first coil 115 or the second coil 120 receives the drive signal from the power amplifier 130 (block 820), and in response to receiving the drive signal, the first coil 115 or the second coil 120 generate a magnetic field (block 825). When both the first coil 115 and the second coil 120 are tuned, both the first coil 115 and the second coil 120 generate a magnetic field and transfer power. The power transfer efficiency provided by the overlapping first coil 115 and second coil 120 is higher than the power transfer efficiency provided by an enlarged transmitter coil including an impedance matching circuit (e.g., simply an expanded first coil 115 coupled to an impedance matching circuitry). For example, in a simulation test, a single enlarged transmitter coil having the same dimensions as the aggregate dimensions of the overlapping first coil 115 and the second coil 120 (e.g., approximately 34 centimeters by 12 centimeters), provides a power transfer efficiency of approximately 60% after an impedance matching circuit is utilized. By contrast, when the wireless power transfer device 105 including the partially overlapping first coil 115 and second coil 120 and using the switch network 125 to detune one of the first coil 115 or second coil 120, the wireless power transfer device 105 provides a power transfer efficiency of approximately 70%, without utilizing an impedance matching circuit.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless power transfer device comprising:
   a first coil having a first portion, and configured to generate a magnetic field;
   a second coil having a second portion, and positioned with respect to the first coil such that the first portion of the first coil overlaps the second portion of the second coil in an overlap region;
   a power amplifier electrically coupled to one selected from a group consisting of the first coil and the second coil, the power amplifier configured to output a drive signal; and
   a flux concentrator aligned with the overlap region and configured to concentrate a magnetic flux of the magnetic field.

2. The wireless power transfer device of claim 1, further comprising
   a switch network electrically coupled to the first coil, the second coil, and the power amplifier, including a plurality of switches, and configured to selectively electrically couple the power amplifier to provide the drive signal to one selected from a group consisting of the first coil and the second coil; and
   an electronic processor configured to control each of the plurality of switches.

3. The wireless power transfer device of claim 2, wherein the switch network is configured to
   operate in an individual configuration in which either the first coil or the second coil is detuned, and
   operate in a combined configuration in which the first coil and the second coil are tuned.

4. The wireless power transfer device of claim 3, wherein the first coil is detuned and the power amplifier is electrically coupled to the second coil.

5. The wireless power transfer device of claim 3, wherein the second coil is detuned and the power amplifier is electrically coupled to the first coil.

6. The wireless power transfer device of claim 2, wherein the electronic processor is further configured to monitor a parameter associated with one selected from a group consisting of the first coil and the second coil, and wherein the electronic processor controls each of the plurality of switches based on the monitored parameter.

7. The wireless power transfer device of claim 3, wherein the electronic processor is configured to
    detect a change in a first impedance, the first impedance being associated with the first coil, and
    place the switch network in the individual configuration in which the second coil is detuned and the power amplifier is electrically coupled to the first coil, when the electronic processor detects the change in the first impedance.

8. The wireless power transfer device of claim 7, wherein the electronic processor is configured to
    detect a change in a second impedance, the second impedance being associated with the second coil, and
    place the switch network in the individual configuration in which the first coil is detuned and the power amplifier is electrically coupled to the second coil, when the electronic processor detects the change in the second impedance.

9. The wireless power transfer device of claim 8, wherein the electronic processor is configured to place the switch network in the combined configuration when the electronic processor detects the change in the first impedance and detects the change in the second impedance.

10. The wireless power transfer device of claim 1, wherein the flux concentrator includes a ferrite layer.

11. The wireless power transfer device of claim 2, wherein the wireless power transfer device performs a power transfer operation associated with an efficiency parameter, and wherein the electronic processor is configured to monitor an efficiency of the power transfer operation performed by the wireless power transfer device, and wherein the electronic processor controls each of the plurality of switches based on the monitored efficiency.

12. The wireless power transfer device of claim 11, wherein the electronic processor is configured to compare a first efficiency of the power transfer operation with a second efficiency of the power transfer operation, the first efficiency corresponding to the efficiency of the power transfer operation when both the first coil and the second coil perform the power transfer operation simultaneously, and the second efficiency corresponding to the efficiency of the power transfer operation when either the first coil or the second coil perform the power transfer operation.

13. The wireless power transfer device of claim 1, wherein a size of the first portion of the first coil and a size of the second portion of the second coil is determined based on at least one factor selected from a group consisting of a geometry of the first coil, a geometry of the second coil, a number of turns of the first coil, a width of turns of the first coil, a spacing between turns of the first coil, a number of turns of the second coil, a width of turns of the second coil, and a spacing between turns of the second coil.

14. A method of wirelessly transferring power with a wireless power transfer device, the wireless power transfer device including a first coil, a second coil, a power amplifier, a switch network, and an electronic processor, the method comprising:
    overlapping a first portion of the first coil with a second portion of the second coil in an overlap region;
    aligning a flux concentrator with the overlap region;
    generating, with the power amplifier a drive signal;
    receiving the drive signal by one selected from a group consisting of the first coil and the second coil; and
    generating, by one selected from the group consisting of the first coil and the second coil, a magnetic field in response to receiving the drive signal.

15. The method of claim 14, further comprising:
    selectively, electrically coupling, with a switch network of the wireless power transfer device, the power amplifier to provide the drive signal to one selected from a group consisting of the first coil and the second coil;
    monitoring a parameter associated with one selected from the group consisting of the first coil and the second coil; and
    controlling the switch network based on the monitored parameter.

16. The method of claim 15, wherein controlling the switch network based on the monitored parameter includes placing the switch network in an individual configuration in which either the first coil or the second coil is detuned, and placing the switch network in a combined configuration in which the first coil and the second coil are tuned.

17. The method of claim 16, wherein placing the switch network in the individual configuration includes detuning the second coil and electrically coupling the power amplifier to the first coil.

18. The method of claim 17, wherein monitoring the parameter includes detecting, with the electronic processor, a change in a first impedance, the first impedance being associated with the first coil, and wherein placing the switch network in the individual configuration includes placing the switch network in the individual configuration when the electronic processor detects the change in the first impedance.

19. The method of claim 16, wherein placing the switch network in the individual configuration includes detuning the first coil, and electrically coupling the power amplifier to the second coil.

20. The method of claim 19, wherein monitoring the parameter includes detecting, with the electronic processor, a change in a second impedance, the second impedance being associated with the second coil, and wherein placing the switch network in the individual configuration includes placing the switch network in the individual configuration when the electronic processor detects the change in the second impedance.

21. A wireless power transfer system comprising:
    an impedance-matching-circuit-free wireless power transfer device including
        a power amplifier configured to generate a drive signal,
        a plurality of coils selectively electrically coupled to the power amplifier, and configured to generate a first plurality of magnetic fields, the plurality of coils couplable to the power amplifier and to each other in a plurality of configurations, the first coil and the second coil configured to terminate at a predetermined impedance in each of the plurality of configurations; and
    an external device including a receiver coil configured to magnetically couple to one of a group consisting of the first coil and the second coil to receive wireless power through the one of the group consisting of the first coil and the second coil.

22. The wireless power transfer system of claim 21, wherein the predetermined impedance is approximately 50 Ohms.

23. The wireless power transfer system of claim 21, wherein the receiver coil receives wireless power at an efficiency of more than fifty percent (50%).

24. The wireless power transfer system of claim 21, wherein the wireless power transfer device includes a switch network electrically coupled to the plurality of coils, and configured to place the plurality of coils in each of the plurality of configurations.

25. The wireless power transfer system of claim 21, wherein one of the plurality of configurations includes a combination configuration in which both the first coil and the second coil are configured to generate the first magnetic field and the second magnetic field.

* * * * *